US006305149B1

(12) United States Patent
Gorlich et al.

(10) Patent No.: US 6,305,149 B1
(45) Date of Patent: Oct. 23, 2001

(54) METHOD AND APPARATUS FOR PACKAGING MEAT

(75) Inventors: Michael P. Gorlich; Robert F. McPherson, Jr., both of Hilton Head Island, SC (US)

(73) Assignee: Marlen Research Corporation, Overland Park, KS (US)

( * ) Notice: Subject to any disclaimer, the term of this patent is extended or adjusted under 35 U.S.C. 154(b) by 0 days.

(21) Appl. No.: 09/092,165

(22) Filed: Jun. 5, 1998

Related U.S. Application Data

(63) Continuation of application No. 08/814,204, filed on Mar. 11, 1997, now abandoned, which is a continuation-in-part of application No. 08/611,272, filed on Mar. 5, 1996, now Pat. No. 5,689,937, which is a continuation-in-part of application No. 08/386,961, filed on Feb. 10, 1995, now abandoned, which is a continuation-in-part of application No. 08/154,756, filed on Nov. 18, 1993, now Pat. No. 5,419,097.

(51) Int. Cl.[7] ............................... B65B 7/28; B65B 51/10
(52) U.S. Cl. ........................ 53/478; 53/329.5; 83/16; 83/171
(58) Field of Search .......................... 53/478, 329.2, 53/329.3, 329.5; 83/171, 16, 18

(56) References Cited

U.S. PATENT DOCUMENTS

| | | | |
|---|---|---|---|
| 3,240,851 | * | 3/1966 | Scalora ...................................... 83/16 |
| 3,583,125 | * | 6/1971 | Vermeulen ....................... 53/329.3 X |
| 3,645,825 | * | 2/1972 | Gaunt et al. .................... 53/329.3 X |
| 3,685,251 | * | 8/1972 | Mahaffy et al. ................ 53/329.5 X |
| 3,874,975 | * | 4/1975 | Lagain ................................... 83/171 |
| 4,018,117 | * | 4/1977 | Patterson .............................. 83/171 |
| 4,243,366 | * | 1/1981 | Lefevre et al. . |
| 4,396,449 | * | 8/1983 | Tumminia . |
| 4,819,413 | * | 4/1989 | Mancini .......................... 53/329.3 X |
| 4,860,621 | * | 8/1989 | Totani .................................. 83/171 |
| 5,074,951 | * | 12/1991 | Banco et al. .......................... 83/171 |
| 5,308,311 | * | 5/1994 | Eggers et al. . |
| 5,429,022 | * | 7/1995 | Nakayama ............................ 83/171 |
| 5,718,101 | * | 2/1998 | Noel et al. .......................... 53/329.5 |

* cited by examiner

Primary Examiner—Stephen F. Gerrity
(74) Attorney, Agent, or Firm—Hovey, Williams, Timmons & Collins

(57) ABSTRACT

A method for packaging meat involves the steps of evacuating air entrained in the meat or between the meat and tray at a station prior to the packaging covering station. When a rotary conveyor is used, this may involve an additional station. However, parallel processing allows low oxygen contents to be achieved inside packages containing food products, which naturally include entrained air, without unduly extending processing time.

17 Claims, 23 Drawing Sheets

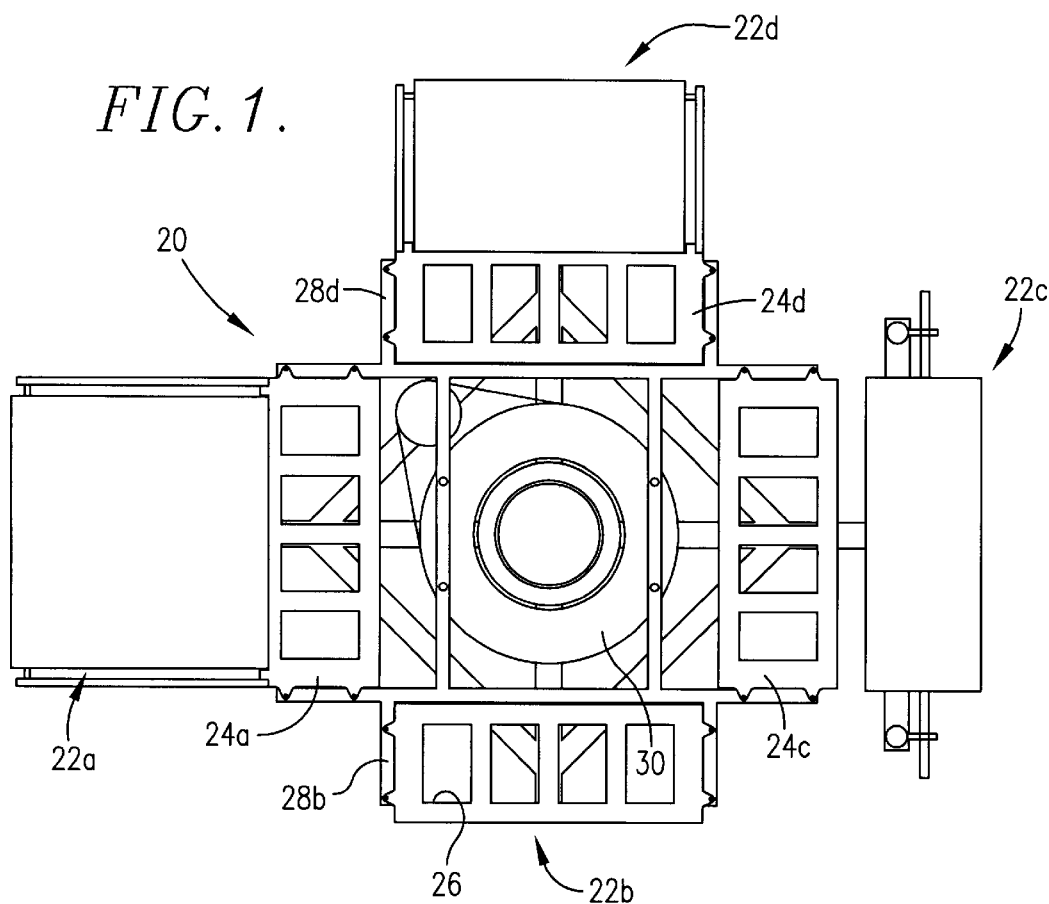
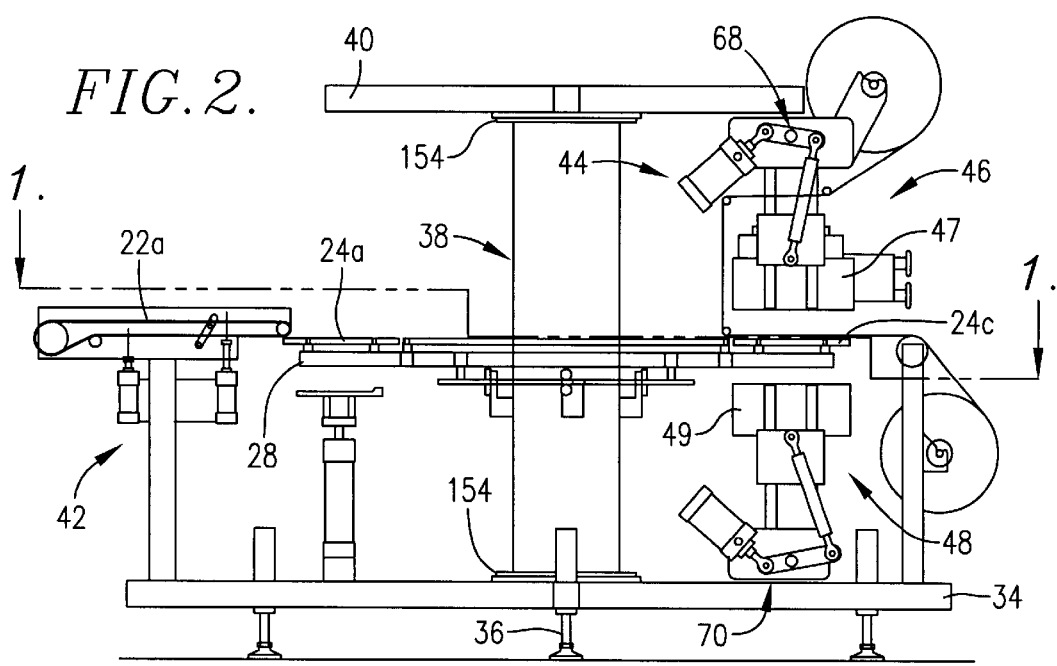

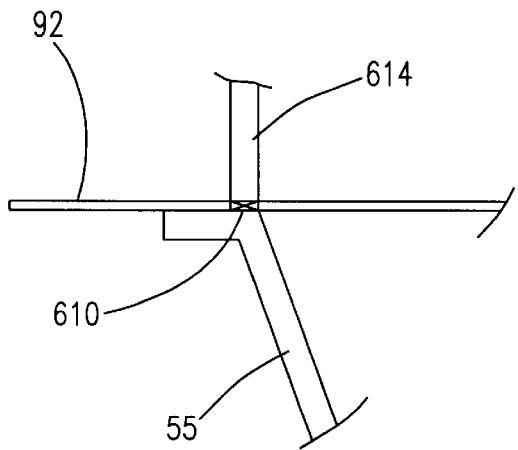
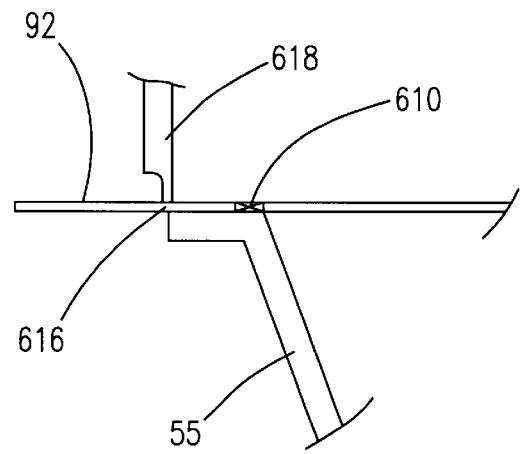
*FIG. 31a.*  *FIG. 31b.*
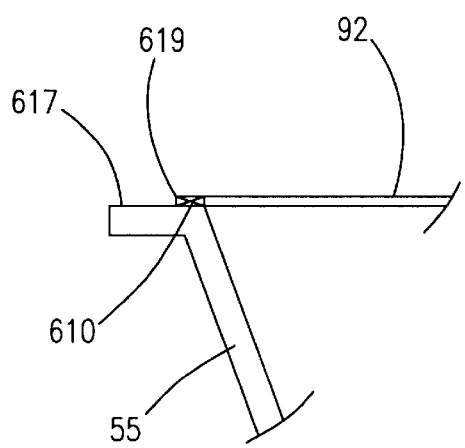
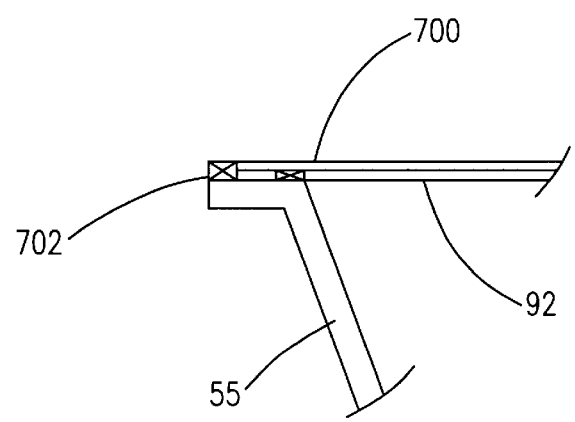
*FIG. 31c.*  *FIG. 31d.*

METHOD AND APPARATUS FOR PACKAGING MEAT

CROSS REFERENCE TO RELATED APPLICATIONS

This application is a continuation of Ser. No. 08/814,204, filed Mar. 11, 1997 (now abandoned), which is a continuation in part of Ser. No. 08/611,272, filed Mar. 5, 1996 (now U.S. Pat. No. 5,689,937), which is a continuation in part of Ser. No. 08/386,961, filed Feb. 10, 1995 (now abandoned), which is a continuation in part of Ser. No. 08/154,756, filed Nov. 18, 1993 (now U.S. Pat. No. 5,419,097).

FIELD OF THE INVENTION

This invention relates to methods for packaging food products. In one embodiment, the packaged product may be maintained in one condition under certain circumstances and then converted to another condition. For example, during transportation the food package might maintain an inert gaseous atmosphere and then, when the package reaches a supermarket or other retail outlet, the food package will permit exposure of the food product to the ambient atmosphere. While a wide variety of food products can be packaged in accordance with the teachings of this invention, it is particularly advantageous in connection with the packaging of meat in a modified atmosphere package such that the meat may be transported in a relatively inert atmosphere and then caused to bloom when it reaches a retail outlet by exposure to oxygen.

BACKGROUND OF THE INVENTION

Historically, meat products have been butchered and packaged in each supermarket or other retail outlet. It has long been recognized that this arrangement is extremely inefficient and expensive. Instead, it would be preferable to permit the meat to be butchered and packaged at an efficient facility which benefits from economies of scale and thereafter to be shipped to individual supermarkets or other retail outlets.

In the past, this desirable goal has not been achievable because most consumers prefer to buy meat which is red in color as a result of exposure to oxygen. However, the meat maintains its red color for only one or two days. Thereafter, if the meat was butchered and packaged in one location and then shipped to another location for eventual sale, by the time the package reached the retail outlet the meat would have undergone the transformation to the purple color and would be effectively unsalable.

To overcome these problems, there have been a number of efforts to maintain the food product in a first atmosphere during shipping and a second atmosphere when the meat product is ready for retail sale. Therefore, it is highly desirable to provide a package that would permit remote meat preparation and subsequent sale after the passage of more than a couple of days. It is equally desirable to have an apparatus and method for packaging such products in an efficient and cost-effective way despite the fact that most consumers would prefer not to invest a large amount of money in elaborate packages.

Thus, it should be apparent that there is a continuing need to solve the longstanding problem of providing a package which permits meat or other food products to be packaged at one location and then to be sold sometime later under different conditions. One approach to solving these problems which has shown considerable commercial promise is disclosed in U.S. Pat. No. 5,348,752 to Michael P. Gorlich. In this patent, a depression is provided in the tray which allows the cutting blade to cut plastic film from a web in place on a tray without damaging the packaging.

Particular problems may arise in packaging meat, such as ground beef, in a modified atmosphere package. Because of the process used to grind meat, air is entrained in the product. The air is released to the package, upsetting the predetermined atmosphere. Particularly where very low oxygen contents are otherwise achievable inside the packaging, the release of entrained oxygen from ground meat once inside the package may reduce the modified packaging efficacy.

SUMMARY OF THE INVENTION

In accordance with one aspect of the present invention, a method of packaging a meat product in a low oxygen atmosphere package includes loading a tray with meat at one station. The tray is transferred to a subsequent station and trapped air is removed from the meat. The tray is transferred to a subsequent station and covered.

In accordance with another aspect, a method of packaging ground meat includes evacuating entrained air from said ground meat held in a tray. After the entrained air is evacuated from the ground meat, the air surrounding the meat in the tray is evacuated. The tray is sealingly covered with a plastic film.

BRIEF DESCRIPTION OF THE DRAWING

FIG. 1 is a cross-sectional view taken generally along the line 1—1 in FIG. 2;

FIG. 2 is a front elevational view of the embodiment shown in FIG. 1.

FIG. 9 is an enlarged, plan view of the quick disconnect tooling at the station 22a;

FIGS. 22a and 22c are enlarged top plan views of another embodiment of a tray loader while

FIGS. 31a–31d is a series of enlarged cross-section views of the flange area illustrating the effect of heat severing a film.

DESCRIPTION OF THE PREFERRED EMBODIMENTS

Figure 3:
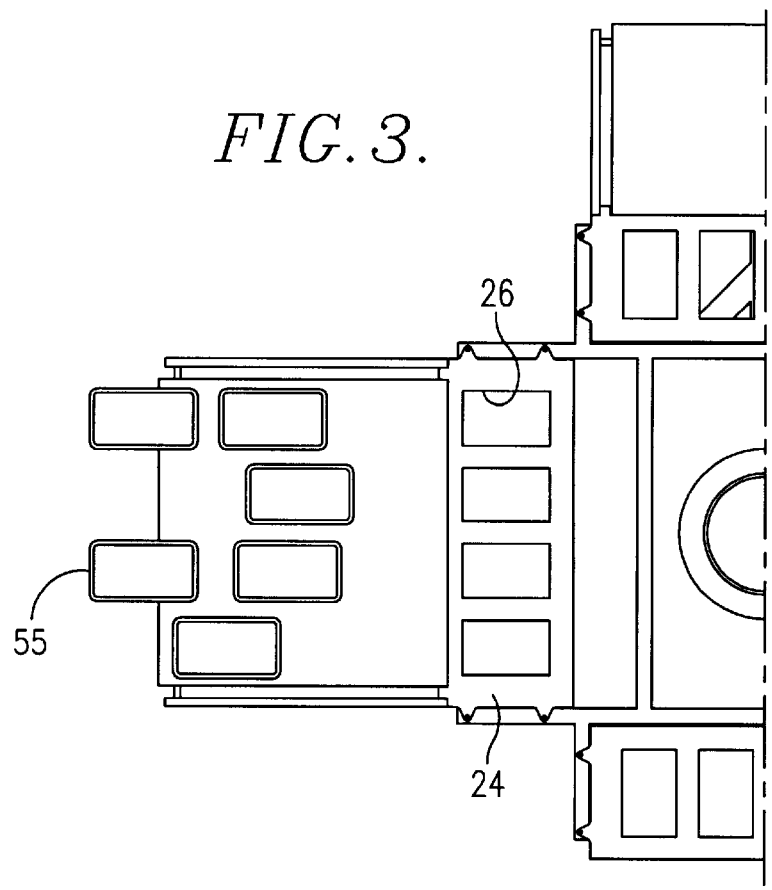
FIG. 3 is an enlarged top plan view of a portion of the embodiment shown in FIG. 1, showing the loading area receiving trays to be packaged.

Referring to the drawing wherein like reference characters are used for like parts throughout the several views, a packaging machine 20, as shown in FIG. 1, includes four stations 22. While the machine is illustrated in a four-station embodiment, it should be understood that one or more of the indicated stations may be unused and that in any particular embodiment it may be possible or desirable to have more or less than four stations. The four stations 22 operate on packages which are moved circularly from one station to the next.

The packages to be produced are held on a platform 24 which in the illustrated embodiment includes slots 26 to receive four package trays. A variety of package types may be utilized. One type of package type uses a relatively rigid molded plastic tray which is covered by either a film or an additional plastic domed closure. Examples of packages of this type are disclosed in U.S. Pat. Nos. 5,348,752 and 5,419,096. Both issued patents are hereby expressly incorporated by reference herein.

The platforms 24 are carried on mounting arms 28 which in turn connect to rotatable ring 30. The ring 30 is driven by the mechanism 32 which may be of any conventional type but is illustrated as being a drive chain and motor arrangement.

The entire machine 20 is supported atop a base 34 on feet 36, as shown in FIG. 2. Base 34 also supports a surge tank 38, which in turn supports a hanger assembly 40. The surge tank 38 provides a central support for mounting the ring 30 and drive mechanism 32. The base 34 and hanger assembly 40 may be utilized to support various equipment positioned at the stations 22 for operating on the food trays contained within the platform 24. For example, as shown in FIG. 2, a tray load mechanism 42 is associated with the station 22a and supported on the base 34. Similarly, a tooling assembly 44 includes an upper portion 46 mounted on the hanger 40 and a lower portion 48 mounted on the base 34. The upper portion 46 includes a housing or chamber 47 and the lower portion 48 includes a housing or chamber 49.

Figure 5:
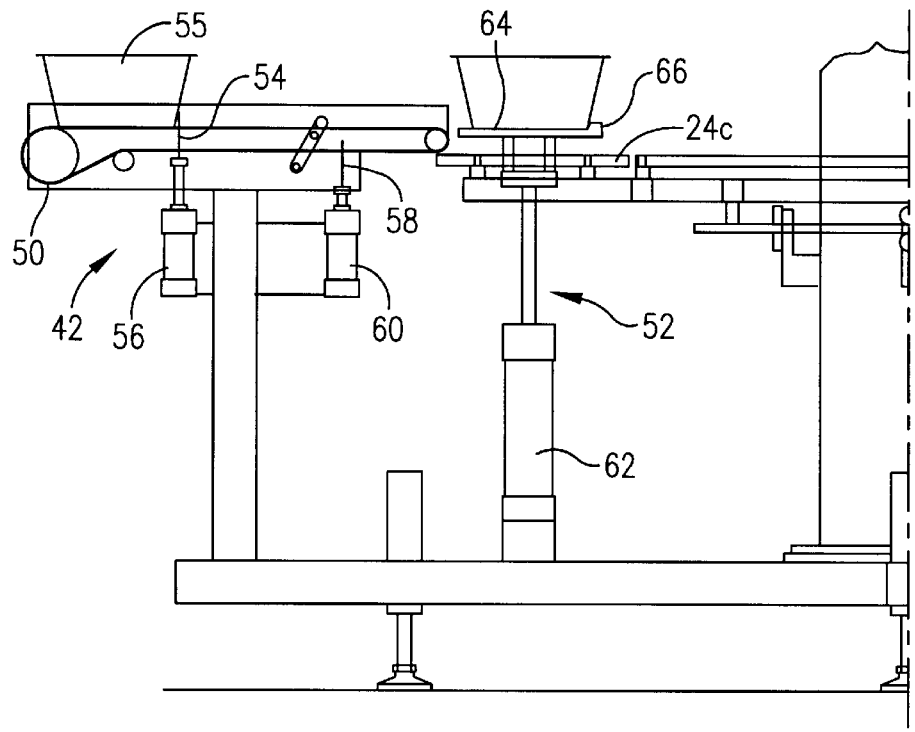
FIG. 5 is a front elevational view corresponding to that shown in FIG. 4 after a row of trays has been positioned atop a receiving platform.

The tray load mechanism 42, shown in FIG. 5, includes a tray conveyor 50 and a tray loader 52. The conveyor 50 may be a conventional belt conveyor wherein the trays 55 are transferred onto the tray conveyor 50. They are aligned by a stop bar 54 powered by a cylinder 56. At the appropriate interval, the trays 55 may be advanced to a second stop bar 58 so that the position previously occupied by the trays 55 may be filled by additional trays. The stop bar 58 is controlled by a second cylinder 60. The trays 55 may be pre-loaded with the food product to be packaged.

Below the platform 24a, there is a cylinder 62 that powers a bed 64 upwardly and downwardly. The bed 64 includes a stop 66 on its inward end. Each bed 64 is designed to receive a tray 55 from the tray conveyor 50 and to lower it into a platform slot 26. Thus, there would be a plurality of mechanisms 62 and 64, one for each of the slots 26 in a platform 24a.

In the illustrated embodiment, the station 22b is an inactive station which is not used. However, in the other applications, it may be desirable or necessary to perform all or part of the operation which is done at another station at the station 22b. The station 22b could be used, for example, to load the food product into the trays 55.

Alternatively, the station 22b may be used when packaging meat to remove air entrained in the product. While one could attempt to remove such air in a subsequent step, the evacuation process needed to remove the air extends the processing time excessively. In station 22b, the package can undergo repeated vacuum purging and nitrogen flushing operations to remove the entrained air.

Air may be entrained within the product, for example, in the case of ground meat. Air may also be trapped in or under the product.

The product may be transferred to the film securing station 22c. Even if it is necessary to stop machine operation after purging, the effectiveness of the purging is maintained in that entrained or entrapped air has been removed.

Figure 30:
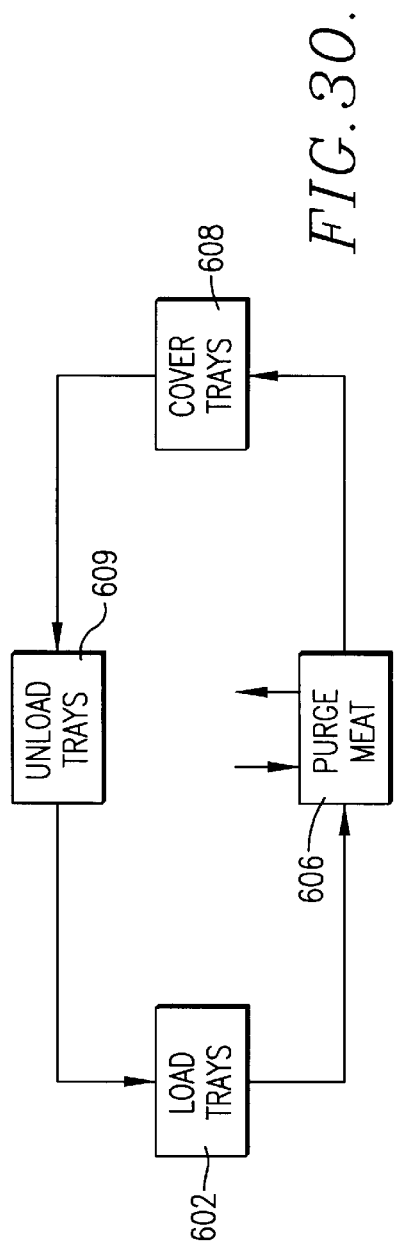
FIG. 30 is a schematic view of an embodiment for removing trapped air.

Referring to FIG. 30, the operation of a packaging machine modified to include a purging step at station 22b is illustrated. The trays 55 are loaded into the machine and filled with the meat as shown at step 602 at station 22a. At station 22b the purging operation described above may be utilized as shown at 606. At stations 22c and 22d, the trays 55 may be covered and closed and the finished packages unloaded as indicated by blocks 608 and 609.

If desired air may be evacuated, followed by supplying a low oxygen content replacement gas, such as nitrogen gas. The replacement gas may be supplied at an elevated pressure relative to atmospheric pressure. This purging process may be repeated as necessary to achieve the desired oxygen level.

In this way, very low oxygen contents can be achieved inside the packages without unduly extending the processing time. Since the gas removal is done in parallel with other operations, processing time is not extended. As a result it may be possible to achieve oxygen contents on the order of 0.05% even with ground meat products, which could have air entrained during the grinding process.

The station 22c includes a tooling assembly 44 made up of an upper portion 46 and a lower portion 48. As shown in FIG. 2, the upper chamber 47 is mounted on a mechanism 68 which allows it to be raised and lowered towards and away from the platform 24. Likewise, the lower chamber 49 is mounted on a mechanism 70 which raises and lowers the portion 48 towards the underside of the platform 24. If desired, either the upper chamber 47 or lower chamber 49 may be stationary.

Figure 7:
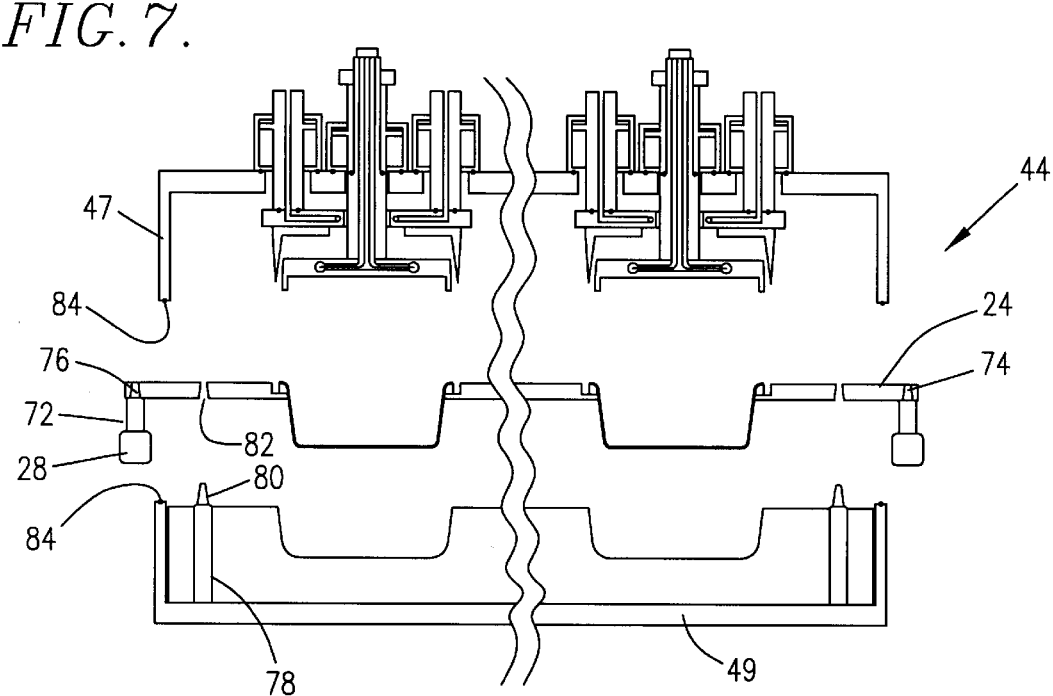
FIG. 7 is a vertical, cross-sectional view partially broken away so as to show two rather than four stations and with vacuum and gas supplying means removed.
Figure 8:
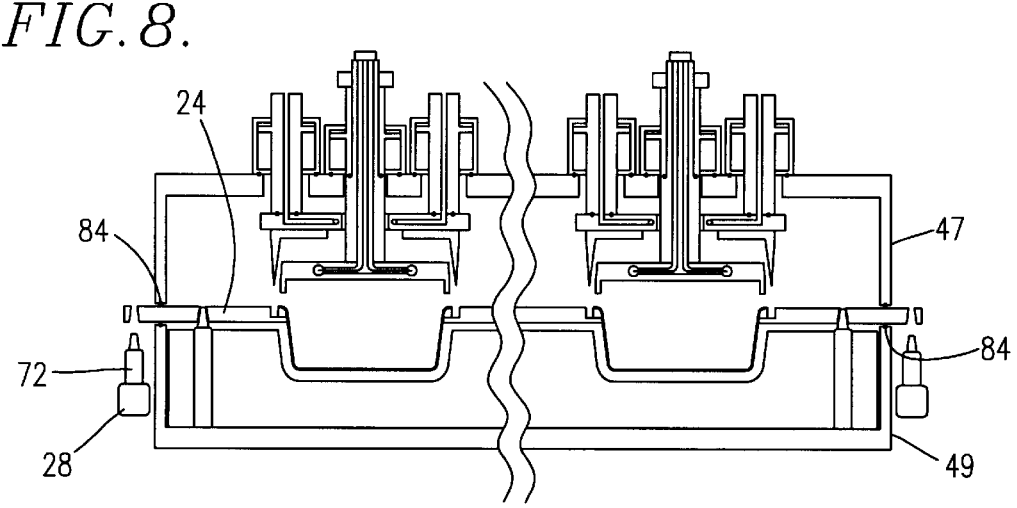
FIG. 8 is a view corresponding to FIG. 7 after the platform has been removed from the rotary arms.

The mounting of a platform 24 on the arms 28 is shown in FIGS. 7 and 8. As shown in FIG. 7, the platform 24 is mounted on the arms 28 by a plurality of upstanding pins 72. Each pin 72 includes a tapered upper portion 74 which fits in a mating tapered portion 76 in the underside of the platform 24. Thus, the platform 24 is removably located on the arms 28 by way of the pins 72.

The lower chamber 49 includes a pair of upstanding pins 78 with tapered portions 80 which mate in holes 82 in the platform 24. Thus, when the lower chamber 49 moves upwardly to engage the platform 24, the tapered portions 80 of the pins 78 mate with the holes 82 in the platform 24. In this way, the platform 24 is very precisely centered and positioned within the station 22c. As shown in FIG. 8, the lower chamber 49 actually lifts the platform 24 off of its pins 72 to achieve the precise alignment. The upper chamber 47 and the lower chamber 49 contain seals 84 which provide an air tight seal with the upper and lower surfaces of the platform 24, again as shown in FIG. 8.

Figure 10:
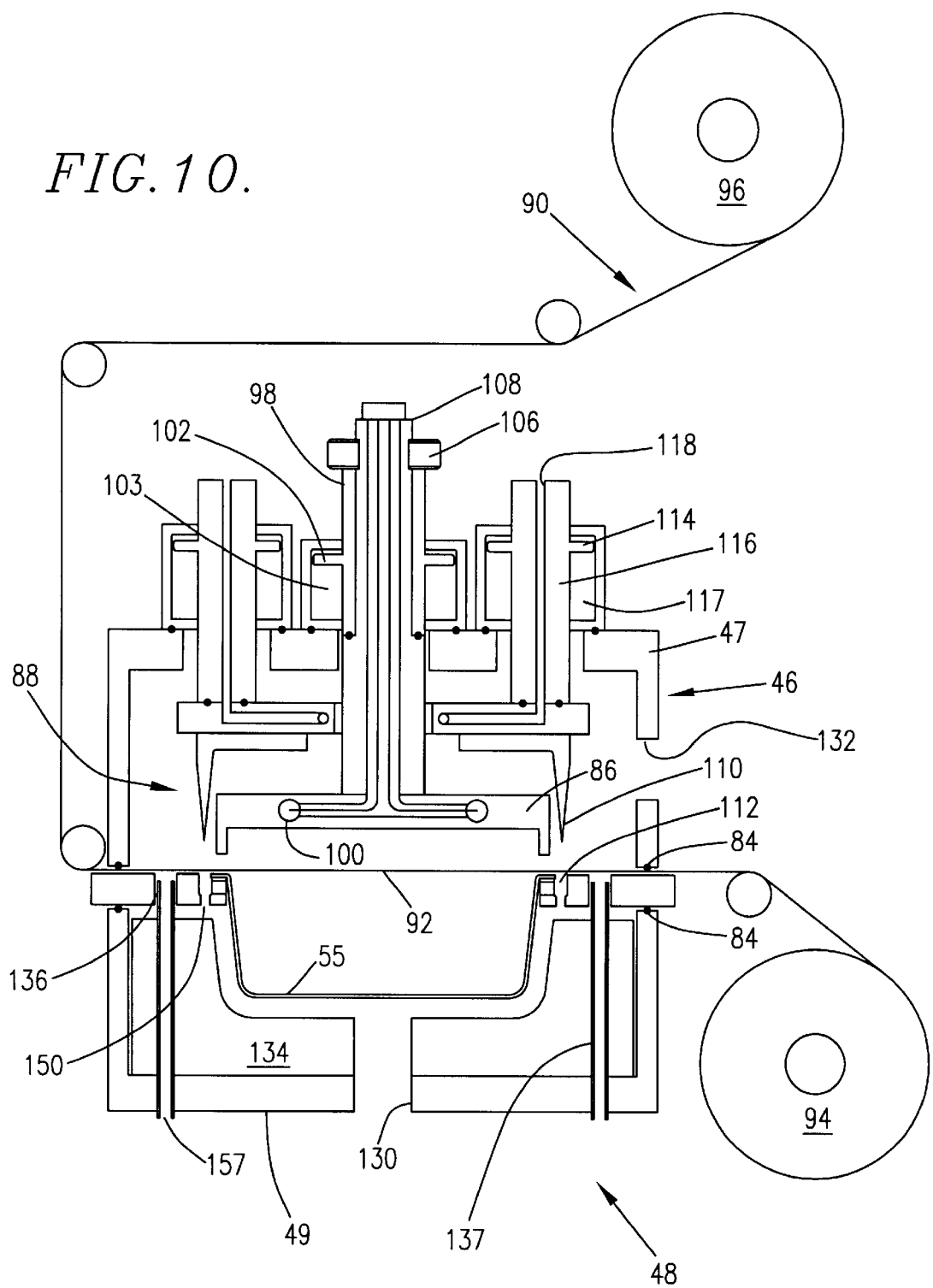
FIG. 10 is an enlarged, cross-sectional view taken generally along the line 10—10 in FIG. 9.

The configuration of the upper and lower portions 46 and 48 of the tooling assembly 44, shown in FIG. 10, includes a sealer 86, a cutter 88, and a web winding system 90. The web 92 may be unrolled from a roll 94, processed inside the tooling assembly 44 and transferred to a waste roll 96. The film 92 may be made of any plastic film used for food packaging including composite films of plastic, aluminum foil, paper, or cardboard.

With the film 92 positioned over the tray 55, it may be sealed by the sealer 86 which is mounted on a shaft 108. The seal bar may be telescopically reciprocated up and down at the appropriate times in order to seal the film 92 to the tray 55. A wide variety of sealers 86 may be utilized; however, one conventional sealer uses electrical resistance heaters 100 in order to heat seal the film to the tray 55. The extent of upward and downward movement of the shaft 108 is controlled by the medial stops 102 under the influence of a conventional fluid energy source. The medial stops 102 are part of a tube 98 which is sealingly secured to the shaft 108.

The sealer 86 may be removed from the mechanism for repair or cleaning when desired simply by unthreading the nut 106. When this is done, the shaft 108 and sealer 86 may be removed downwardly from the mechanism.

The cutter 88 includes a pair of blades 110 positioned to enter the recess 112 in the platform 24. These blades cut the film 92 completely around the upper circumference of the tray so that it conforms to the configuration of the tray 55. Of course, any conventional severing technique may be utilized including cutting or heat severing. Also, more than one web or film may be severed for attachment to the tray 55. Like the sealer 86, the cutter 88 reciprocates upwardly and downwardly around the sealer 86. It is controlled by stops 114 on arms 116 under the influence of a conventional fluid energy source.

The cutter 88 also includes an internal coolant circulation passage 118. Connected to a source of external cooling liquid, the passage 118 provides a medium for cooling the cutter 88. The cutter 88, in close proximity to the sealer 86, is subject to possible heat related malfunctions. By cooling the cutter 88, the precision of the cutting operation may be maintained even in a relatively hot environment.

The lower chamber 49 contains a gas exchange passage 130 in its lower surface, while the upper chamber 47 includes a gas exchange passage 132 in its side wall. The lower portion 48 may include filler 134. Each platform 24 includes a plurality of gas exchange passages 136. The gas exchange passage 132 communicates with a vacuum source by way of the quick disconnect device 138, shown in FIG. 9. That device is secured to the upper chamber 47 by threaded knobs 140. Similarly, device 142 is connected by threaded knobs 144 to lower chamber 49 to provide gas exchange via opening 130.

Figure 9:
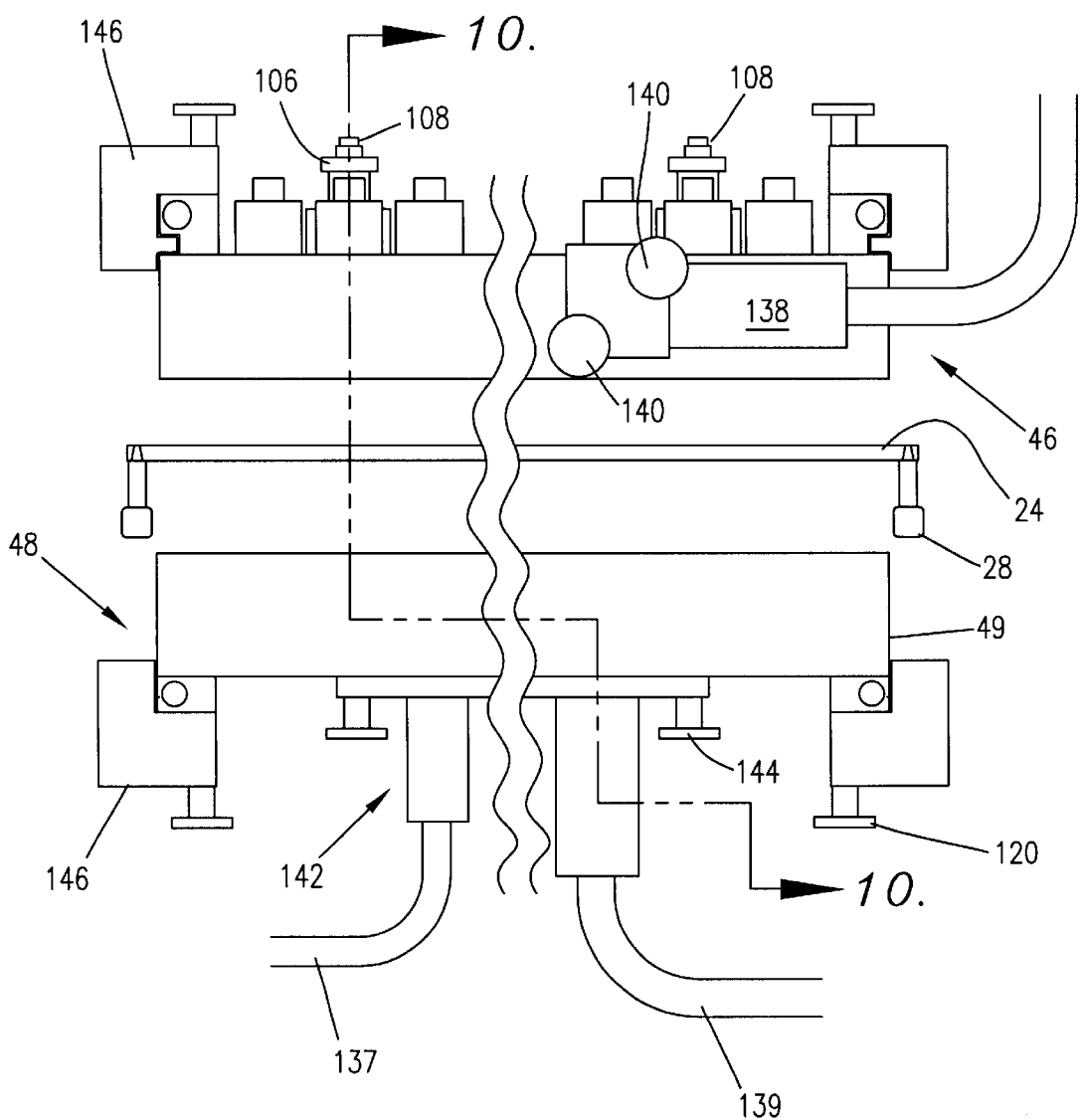

Referring to FIG. 9, it is evident that the connections to the upper and lower portions 46 and 48 are all of the quick disconnect variety so that the machinery associated with any particular station 22 may be readily removed from the remainder of the machine 20. Moreover, the connections for power and fluid may likewise be of the quick disconnect variety. Thus, the connections such as those shown at 120 may be disconnected by simply pulling them apart or unscrewing them and then the mechanisms 146 holding the upper and lower chambers 47 and 49 may be disconnected in the same fashion so that the upper and lower chambers 47 and 49 may be quickly removed.

Figure 11:
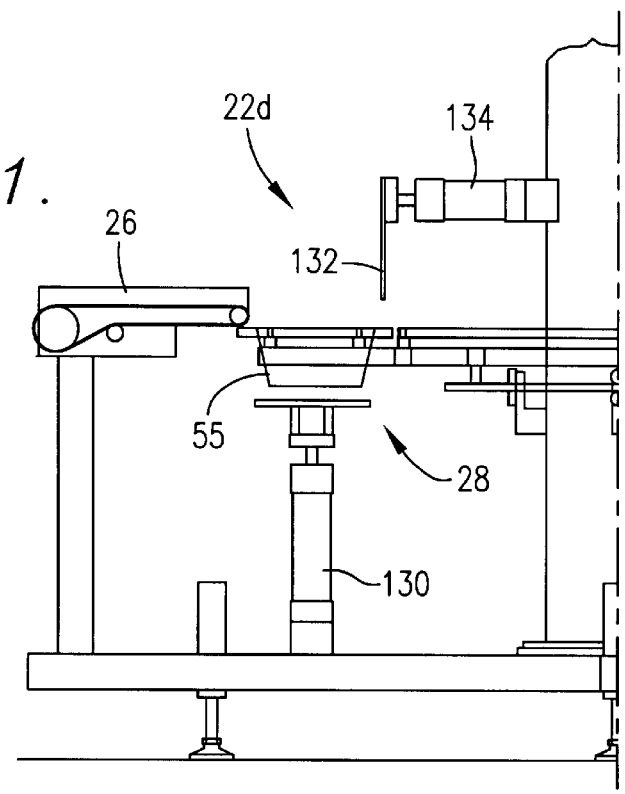
FIG. 11 is a partial, side elevation view of the unloading station.
Figure 13:
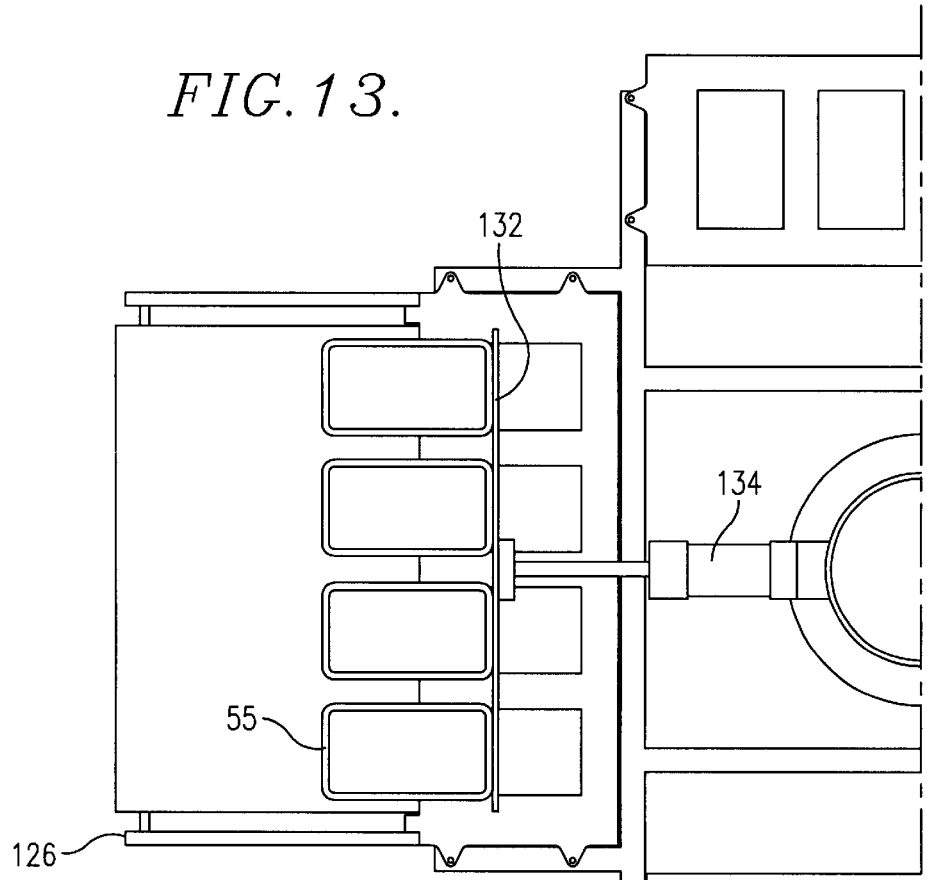
FIG. 13 is a top plan view of the embodiment shown in FIG. 12 after the trays have been pushed onto the unloading conveyor.

The unloading station 22d, shown in FIG. 11, includes an unloading conveyor 126 and a tray pusher 128. At the appropriate time, the trays 55 in a platform 24 are pushed upwardly by the cylinder 130 of the pusher 128. Then the trays are pushed laterally by the slider 132 powered by cylinder 134. The trays are pushed onto the conveyor 126 as indicated in FIG. 13.

Figure 4:
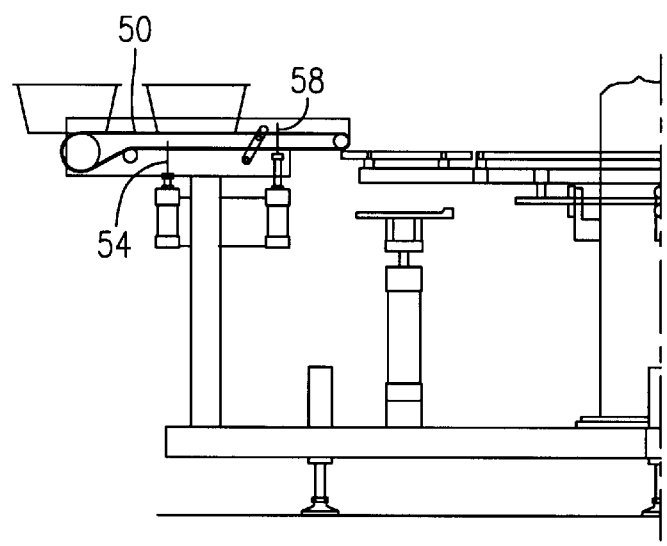
FIG. 4 is a front elevational view of the portion shown in FIG. 3.

The machine is operated generally as follows. Initially, a plurality of trays 55 are organized on the conveyor 50 of the tray load assembly 42. As indicated in FIGS. 3 and 4, the trays are formed into two rows of four trays through the operation of the stop bars 54 and 58. Trays are originally allowed to ride up against stop bar 58 so that they slide relative to the rotating conveyor 50. A second row of trays then back up to the first row of trays.

Figure 6:
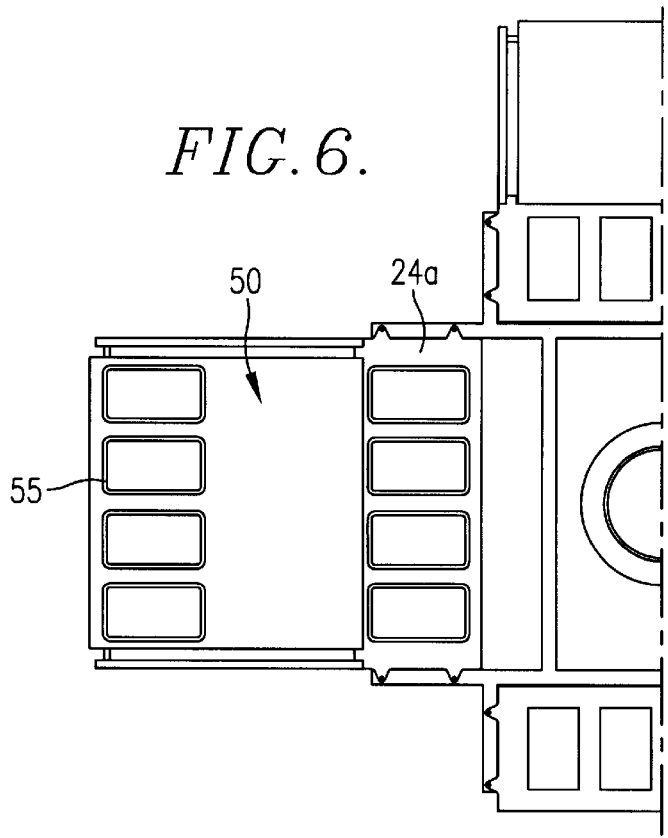
FIG. 6 is a top plan view of the portion shown in FIG. 5.

As shown in FIGS. 5 and 6, at the appropriate time, the second stop bar 58 is lowered allowing the first row of trays to pass onto the bed 64. Each bed 64 is thereafter lowered so that each tray 55 is held in a slot 26 in the platform 24.

After a passage of time, the platform 24 is rotated 90 degrees to the station 22b. Thereafter, the stop bar 58 is operated to allow the second row of trays 55 to be loaded into a subsequent platform 24 rotated into station 22a from station 22d. From station 22b, the platform 24 rotates into the station 22c as shown in FIG. 1.

As shown in FIGS. 7 and 8, at the tooling assembly 44, the platform 24 is lifted from its supports 72 and held between the upper chamber 47 and the lower chamber 49 of assembly 44. Precise alignment is achieved through the operation of the pins 78 and holes 82 interact to guide the platform into the desired portion within the station. In this way, the trays 55 are precisely positioned with respect to the tooling assembly.

After the platform 24 is in position, a vacuum is drawn in the upper chamber 47 through the gas exchange passage 132. This is possible since the upper chamber 47 sealingly engages the film 92 through o-ring seals 84. After the drawing of a vacuum is begun in upper chamber 47, a vacuum is begun to be drawn in the lower chamber 49 via a vacuum tube 139. This is possible because the lower chamber 49 sealingly engages the platform 24, against the upper chamber 47, through an o-ring seal 84.

As a result, good fluid communication is achieved with the exterior of the tray 55, under the film 92. This is because the vacuum in the upper chamber 47 lifts the film 92, allowing air to be exhausted from the tray 55 through a series of holes on slots 150 in the bottom of recess 112 of the platform and out the opening 130. The provision of the filler 134 makes this process proceed more quickly.

After the vacuum is drawn, a desired atmosphere is then pumped into the tray via the openings 151 and 136 from the gas tube 137. This atmosphere is preferably one which is reduced in oxygen content to extend the life of the packaged food product.

As shown in FIG. 10, the film 92 may be heat sealed to the tray 55 using the sealer 86. This operation may be a conventional heat sealing operation. The sealer 86 reciprocates downwardly under the control of the stops 102 in response to changing fluid pressure in the chamber 103.

After the film 92 is sealed to the tray 55, the film is cut by cutter 88. The cutter 88 reciprocates downwardly to cut the film 92, eventually entering the recess 112. The movement of the cutter 88 is controlled by the fluid pressure in the chamber 117. In this way the desired atmosphere may be sealed into the package. Of course, other gas exchange techniques may be utilized as well. Advantageously, the atmosphere inside the assembly 44 is reduced in oxygen content so that the food product will have a longer useful life.

The operation of the cutter 88 may be adversely affected by the ambient heat within the assembly 44 which is greatly augmented by the heat created by the heat sealing operation. This heat may distort the cutting blades and cause inaccuracies therein. For this reason, a source of cooling fluid, for example water, may be circulated through the passage 118 so as to cool the cutter 88.

After this operation is complete, the upper chamber 47 and the lower portion 49 may be moved apart and the rolls 96 and 94 advanced so as to bring a new section of film into position between the chambers 47 and 49. Trays 55 are then advanced to the next station 26$d$.

Figure 12:
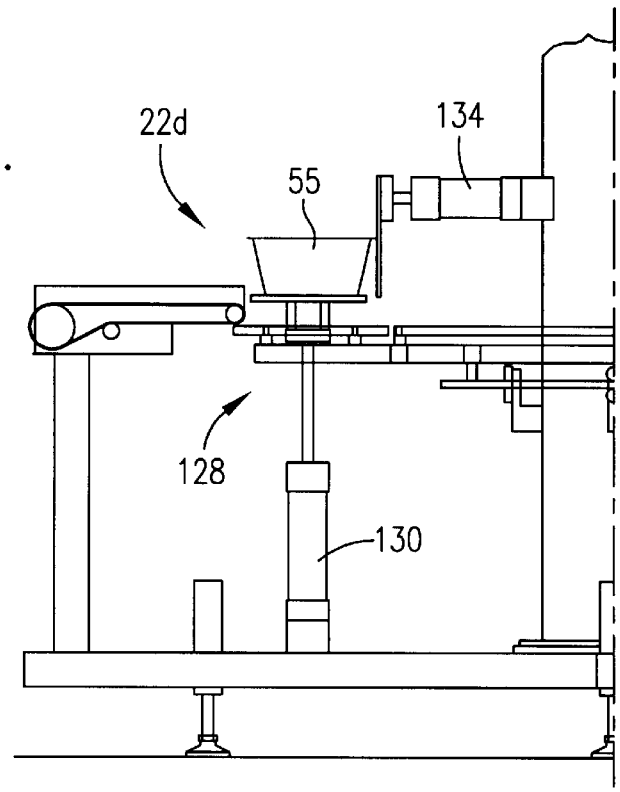
FIG. 12 is a partial, side elevational view of the unloading station after a platform has been raised to an "up" position.

As shown in FIG. 11, in station 22$d$ the trays 55 are positioned over the tray pushers 128 and cylinders 130. At the appropriate time, one or more trays 55 are pushed upwardly through the action of the cylinders 130 and pushers 128 as shown in FIG. 12. Thereafter, the trays may be taken away from the rotary conveyor by the unloading conveyor 126.

The entire operation is facilitated by the rotary arrangement of the stations 22. The operation of the conveyor is continuous since it is laid out in the rotary arrangement. In this way, problems arising from the need to return the platforms 24 to the initial position at the end of a linear conveyor are eliminated.

Figure 14:
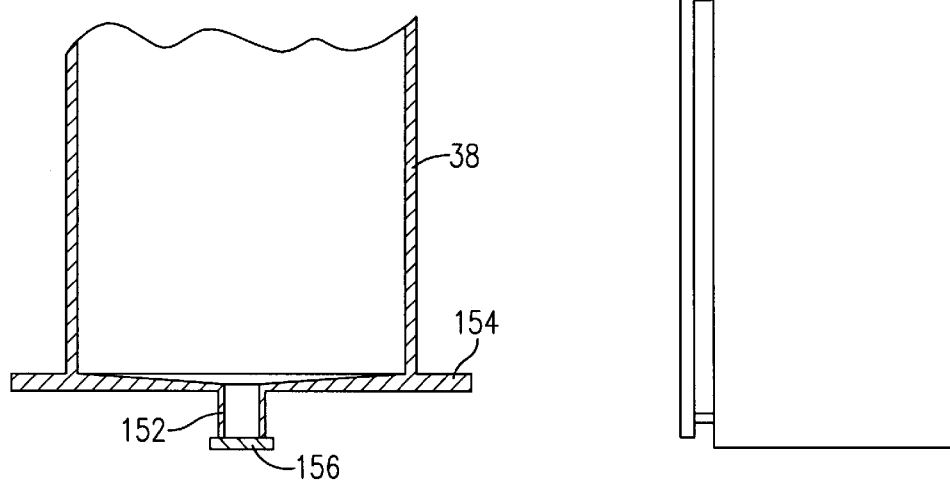
FIG. 14 is an enlarged, partial, cross-sectional view of the bottom of the surge tank.

Moreover, with the rotary arrangement the central area may be occupied by the conveniently located surge tank 38. This tank supplies a source of fluid pressure for the various operations in the surrounding rotary conveying apparatus. The tank 38 is normally closed by caps 154 on both ends. As shown in FIG. 14, a drain 152 is provided at the bottom of the surge tank 38 for releasing a sanitizing solution. The drain may be closed by a removable cover 156. The interior of the tank 38 may be washed with the bacteriostatic solution to minimize bacteria transfer to the packaging. The tank 38 also provides the support for the drive mechanism 32 and rotatable ring 30.

In addition, because of the rotary arrangement of the conveyor, any particular station may be easily accessed for removal from the rest of the machine. Any particular station may be easily replaced with a more appropriate station for any particular operation. Also, a malfunctioning apparatus may be replaced with a working apparatus. Because of the rotary arrangement, access to the individual stations for repair is facilitated.

Repair and replacement is also facilitated by making the various connections to the stations for electrical and fluid power of the quick disconnect variety. Moreover, by making the means of attachment of the particular apparatus to each station of a quick disconnect variety it is possible to change stations quickly to convert the machine for other uses or to replace a broken piece of equipment.

Figure 15:
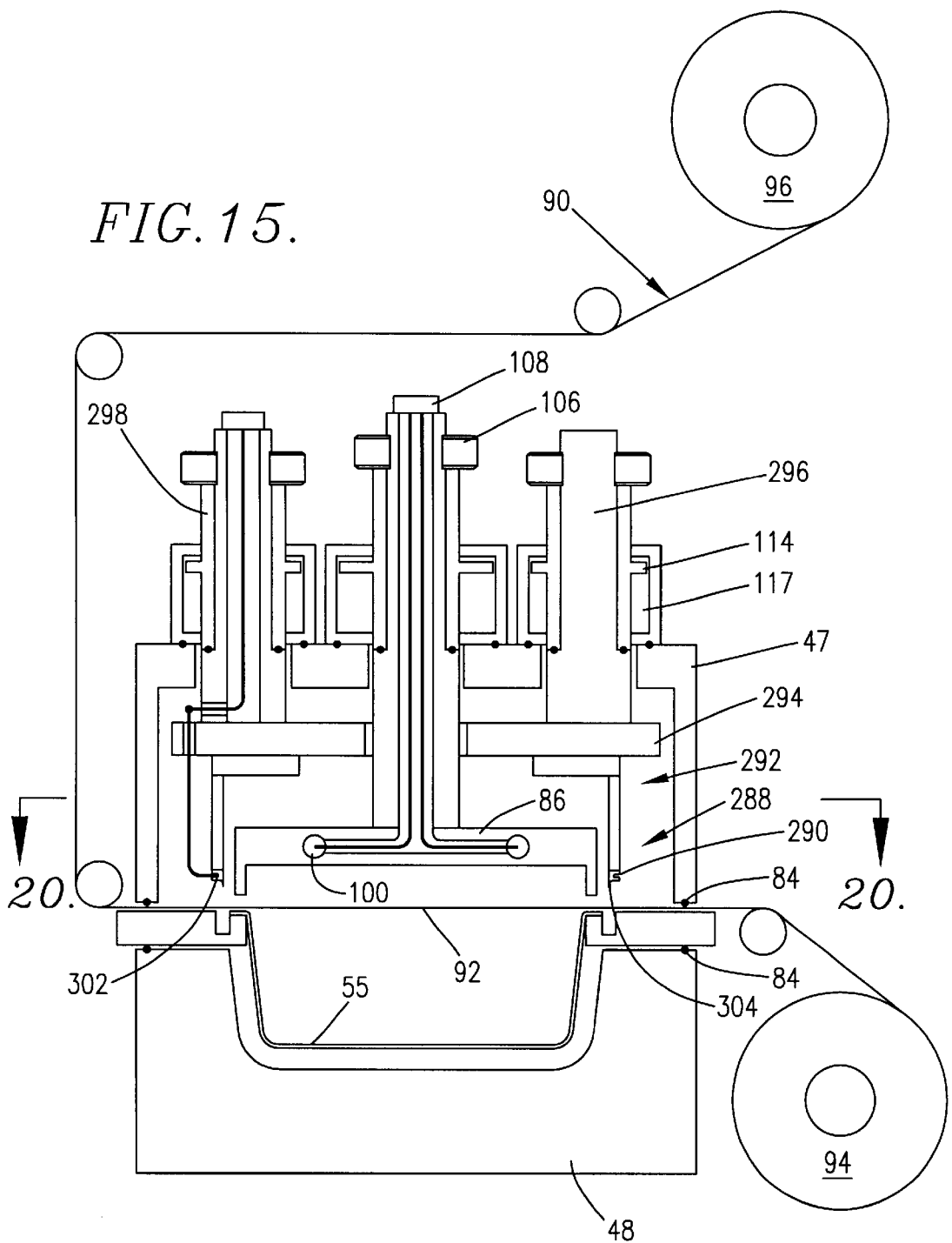
FIG. 15 is a cross-sectional view of an embodiment of the present invention taken generally along the line 15—15 in FIG. 20.

An alternate cutting system 288 includes a blade 290, as shown in FIG. 15. Particularly, a cutting blade 290 is mounted on a support assembly 292 which in turn is supported on a reciprocating bed 294. The movement of the bed 294 is controlled by cylinders 296 and 298. Also mounted on the bed 294 are a set of opposed film holders 300 which may have a vertical length somewhat longer than the vertical length provided to the blade 290.

Figure 18:
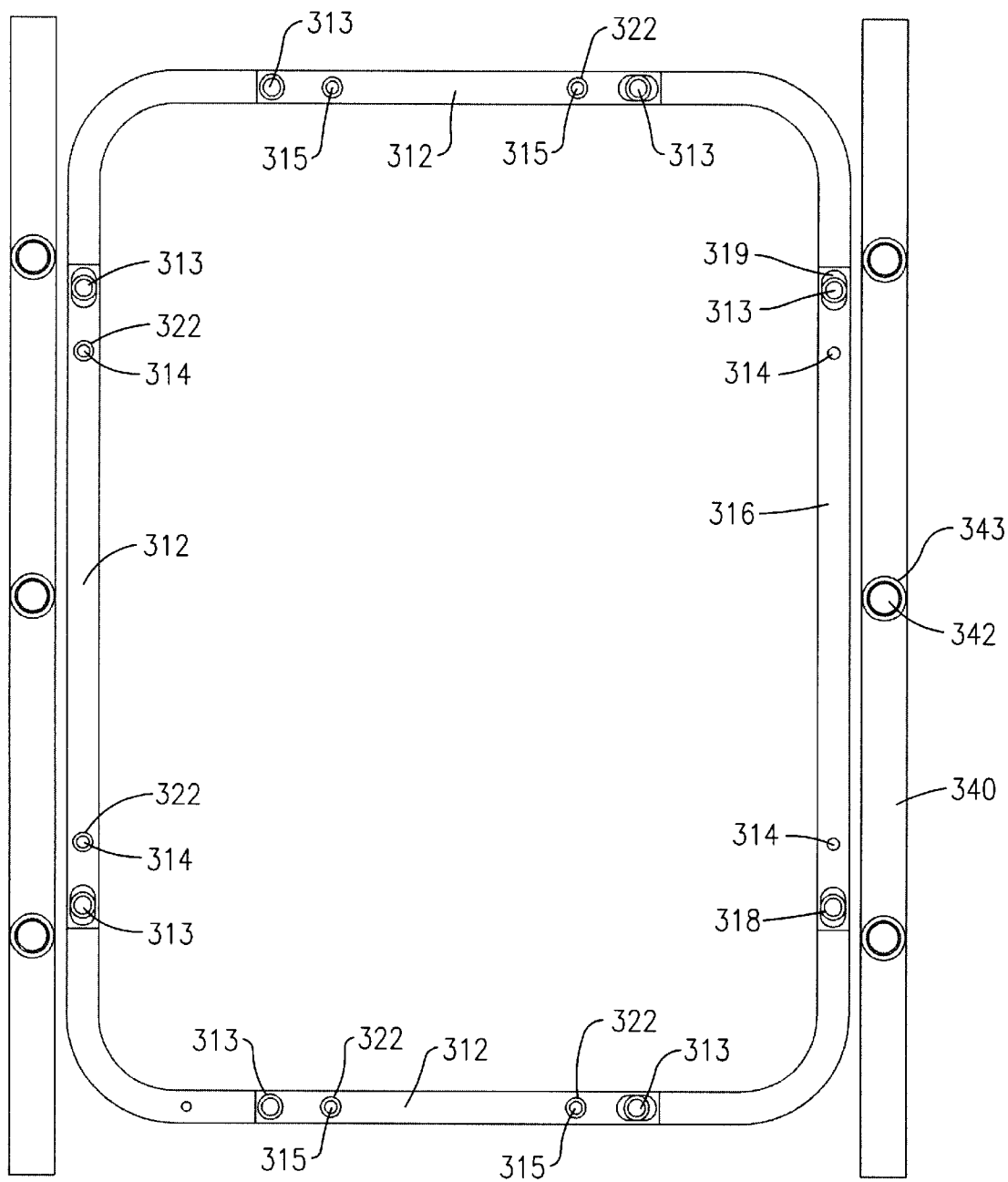
FIG. 18 is a cross-sectional view taken generally along the line 18—18 in FIG. 16.

As shown in FIG. 18, the blade 290 may have a closed configuration such that it is capable of punching out a portion of film from the web 92. The blade 290 is ideally made of low mass such that the heat dissipation of the blade is minimized. The support assembly 292 provides for slight relative movement between the bed 294 and the blade 290. In this way, expansion arising from heating of the blade 290 may be allowed. Also, the support assembly 292 may thermally insulate the blade 290.

Figure 16:
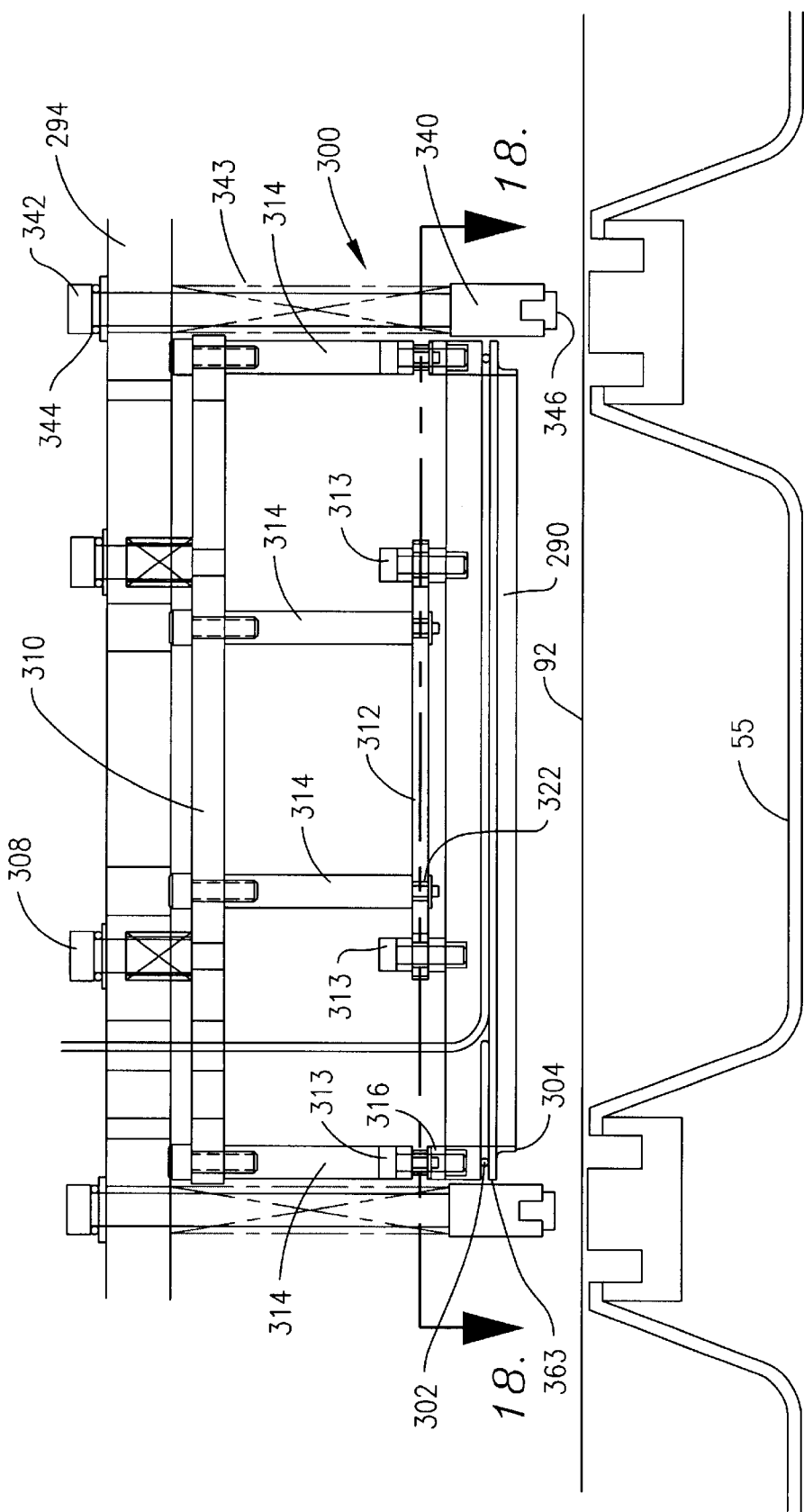
FIG. 16 is a cross-sectional view taken generally along the line 16—16 in FIG. 20 showing the movable blade support assembly with the seal bar removed.

A heater 302 extends along the periphery of the blade 290 as close as possible to the cutting edge 304 of the blade 290. By minimizing the mass of the blade 290 and situating the heater 302 close to the cutting edge 304, the heat dissipation can be reduced. This permits the use of relatively high temperatures at the cutting edge 304. In the illustrated embodiment, the heater 302 is received in a slot 303 in the blade 290, as shown in FIG. 16.

The heater 302 may be a cable heater that includes a pair of high temperature resistance heating wires separated from an outer metal sleeve by an electrical insulator. Ideally, the heater 302 is on the order of $\frac{1}{16}$" thick so that it can be placed very close to the cutting edge 304. Moreover, the blade 290 may be made relatively small, for example, on the order of $\frac{1}{2}$" high and $\frac{1}{4}$" wide.

It is desirable that the cutting edge 304 be of a small width. In one embodiment, the cutting edge 304 has a width of less than 20 mils and, ideally it has a width of about 15 mils.

The heater 302 is supplied with electrical current from a current source not shown. Preferably, the current source and the heater 302 are configured to allow heating of the cutting edge 304 to extremely high temperatures, for example, greater than 500° F. Preferably, the heater heats the film to be cut to the point where it quickly vaporizes. In a preferred form of the present invention, heater temperatures on the order of about 600° to 900° F. are achieved. The precise temperature used depends on the vaporization point and thickness of the particular material being cut.

The cylinders 296 and 298 may be air cylinders which quickly move the bed 294 downwardly and upwardly. Ideally, the down cycle of the bed 294 may be on the order of fractions of a second. Cutting may be advantageously achieved through the application of heat rather than with pressure.

The film 92 to be cut may be held by holders 300 which include clamps 340 connected to the bed 294 by spring-biased bolts 342, as shown in FIG. 16. The bolts 342 may be mounted on an o-ring 344. The ends of the holders 300 have bumpers 346. Coil springs 343 encircle the bolt 342, and are retained at the lower end by the clamps 340.

Figure 20:
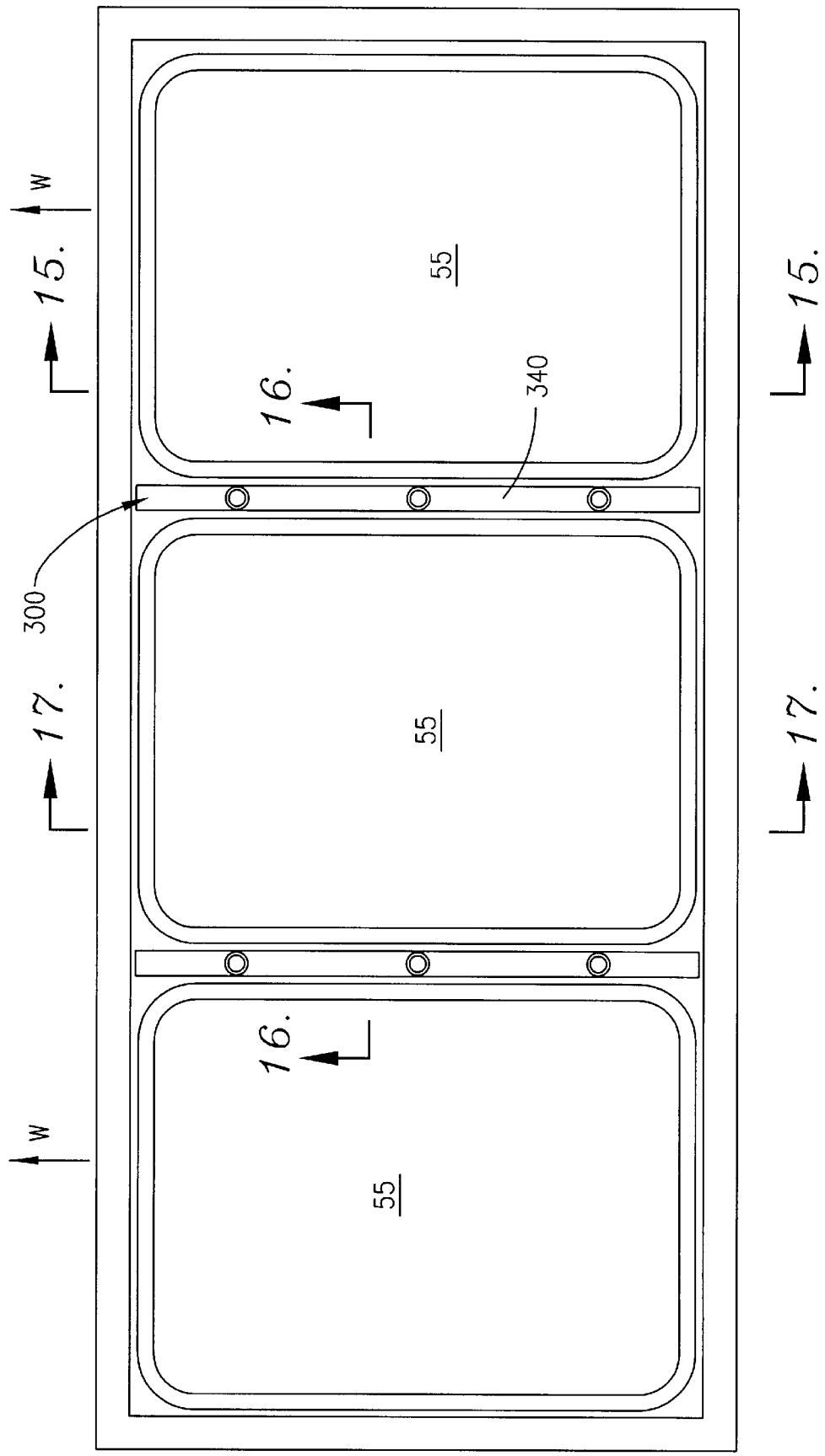
FIG. 20 is a cross-sectional view taken generally along the line 20—20 in FIG. 15.

Referring to FIG. 20, the arrangement of the holders 300 is illustrated, with the web 92 direction indicated by the arrows labelled "W". The trays 55 are separated by a width slightly greater than the width of the clamps 340. The peripheral portions of the film 92 are held by the clamping action of the upper chamber 47 and tray plate 24. This is particularly advantageous in that the amount of film which is devoted to film holding is minimized. This means that less film is wasted.

Referring to FIG. 16, the cutting blade 290 is connected to the movable bed 294. The assembly 292 may include a set of spring-biased pins 308 that may be used to mount a carrier 310 for up and down movement. Two opposed sets of stanchions 313 and a moveable strap 312 are suspended by pins 314.

Figure 17:
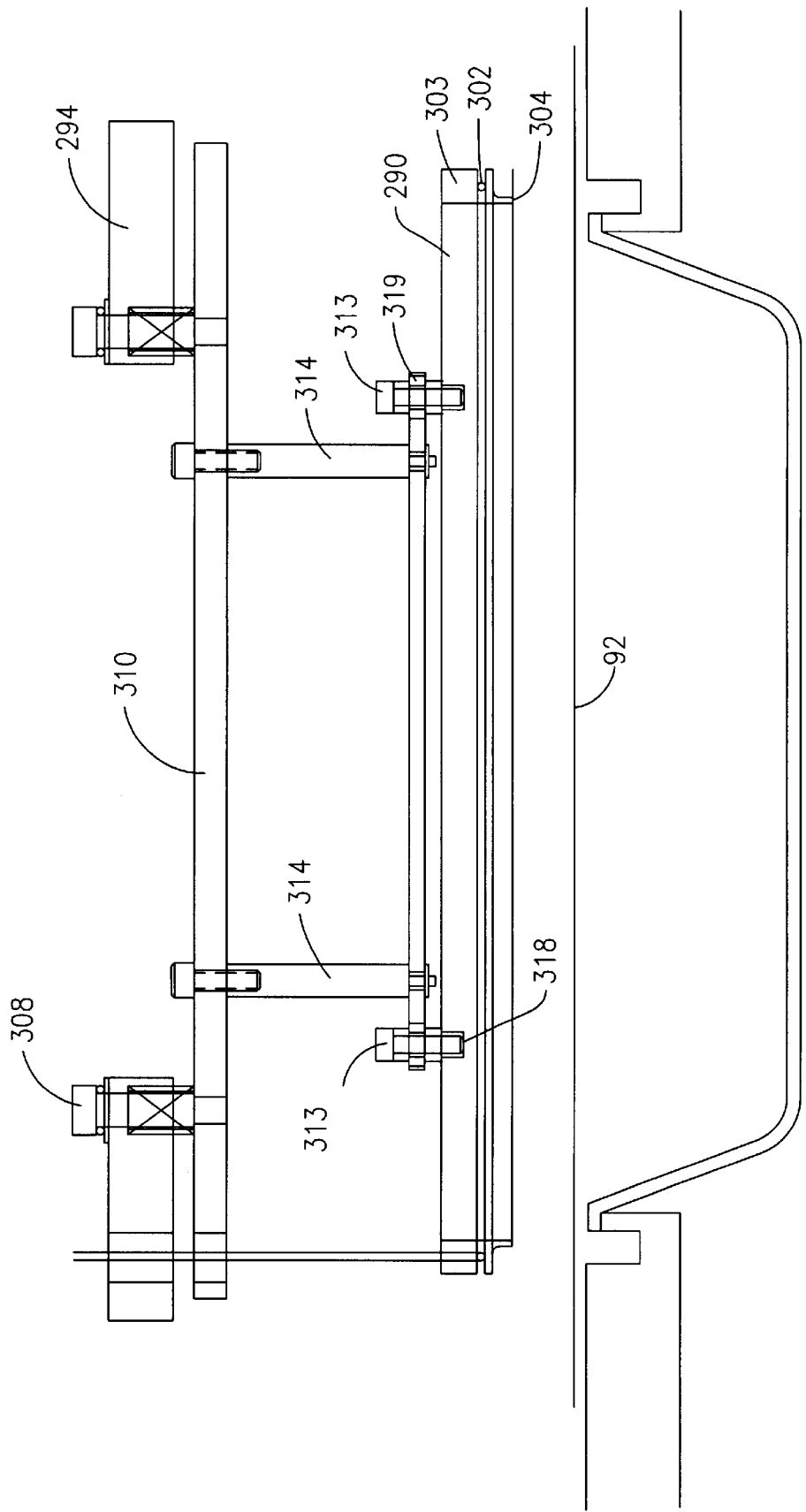
FIG. 17 is a cross-sectional view taken generally along the line 17—17 in FIG. 20 showing the fixed blade support assembly with the seal bar removed.

As shown in FIG. 17, the stanchions 313 also connect the fixed strap 316 to the blade 290. The strap 316 fixedly connects to the blade 290 at 318. Relative movement between the blade 290 and the strap 316 may be provided by the slot 319. In this way, the blade 290 can expand in length relative to the strap 316. The fixed strap 316 may connect to the bed 294 by spring-biased pins 308, the carrier 310, and the pins 314.

Figure 19:
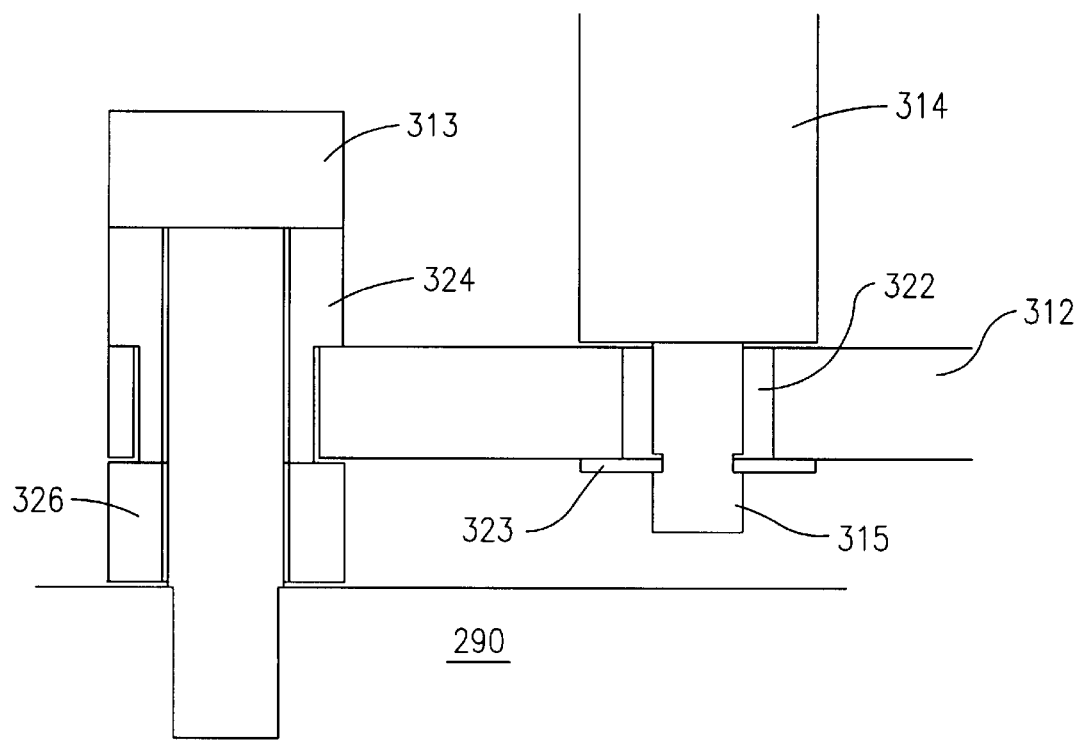
FIG. 19 is an enlarged side elevation view showing the connection of a column to the blade.

The moveable straps 312 include oversized holes 322, as shown in FIG. 19. The pins 314 have reduced diameter ends 315 which are held in the holes 322 by retaining rings 323. The stanchions 313 pass through the straps 312 and connect the straps 312 to the blade 290. The stanchions 313 have a ceramic or stainless steel bushing 324 and washer 326 between themselves and the straps 312 to provide insulation against heat transfer from the blade 290 to the rest of the machine. The same system is used to provide heat insulation on the fixed strap 316.

The connections to the blade 290 are shown in FIG. 18. The fixed strap 316 allows the blade 290 to expand along its length only, because of the slot 319, which allows blade expansion relative to the fixed connection at 318. The other three sides of the blade 290 are supported by moveable straps 312. Each strap 312 connects to the carrier 310 by pins 314. Each pin 314 is received in an oversized hole 322 which allows movement of the strap 312 in all directions relative to the blade 290. The moveable straps 312 then are connected to the blades by outwardly located stanchions 313.

Through the operation of the system 292, the blade 290 can accommodate essentially any heat expansion related stress. Moreover, because of the insulation capabilities of the system 292, the blade heat dissipation is reduced.

The present invention can be used to cut a variety of plastic films. This includes films that are elastic and inelastic. That is, the same machine may be capable of cutting both types of films. Where elastic films are utilized, it is desirable in many cases to cause the elastic film to be tensioned. In this way, when the film is cut, it tends to pull back after it is cut. As shown in FIG. 31a, the film 92 may be sealed at 610 using the seal bar 614. The film 92 may be cut at 616 using heated cutting blade 618, as shown in FIG. 31b. As a result, the film shrinks from point 616 to point 610, as shown in FIG. 31c. The shrinking of the film edge 619 creates an open area 617 for sealing an additional web 700 over the first web 92 at 702, as shown in FIG. 31d. This aids the cutting process while producing a better looking edge. Moreover, the use of heat shrinking film may improve both the cutting action and appearance of the finished product.

The present invention advantageously involves the use of temperatures which are sufficiently high to cause plastic vaporization. This accomplishes both rapid and reproducible cutting without blade fouling. For example, a coextrusion of polyethylene and ethylene vinyl acetate may be severed with the present system. At approximately 250° F. this material softens sufficiently to be sealed to other layers. At about 350° F. melting begins. At about 600° F. some vaporization occurs, but cutting may not be clean all around. Plastic strings may be created. However, at about 800° F. for example, there is effective vaporization of the film. The film may be cut cleanly and reproducibly. The use of force is unnecessary to the cutting and no backing plate is necessary on the side of the film opposite the blade.

The system 288 may be operated in the following fashion. Upon activation of the bed 294, the blade 290 moves quickly downwardly and through the film 92. The severing action is the result of film vaporization.

Prior to cutting, the film is held at two spaced locations. On one side, it may be held by the sealer 86. On the other side, it may be held by the holders 300 which initially extend past the blade 290, and the upper chamber 47.

Between the point where the film is held by holders 300, the sealer 86, and the upper chamber 47, the film may be unsupported. It is at this unsupported intermediate position that the film, most advantageously, is cut. The film 92 may be sealed to the tray 55 on contact by the sealer 86.

The improved film cutting system 288 may be used in place of the system 88. It is also possible to seal the film in one station and to cut the film at a subsequent station under different atmospheric conditions. For example, the film may be sealed under vacuum conditions at one station and severed at a subsequent station under atmospheric conditions.

Figure 21:
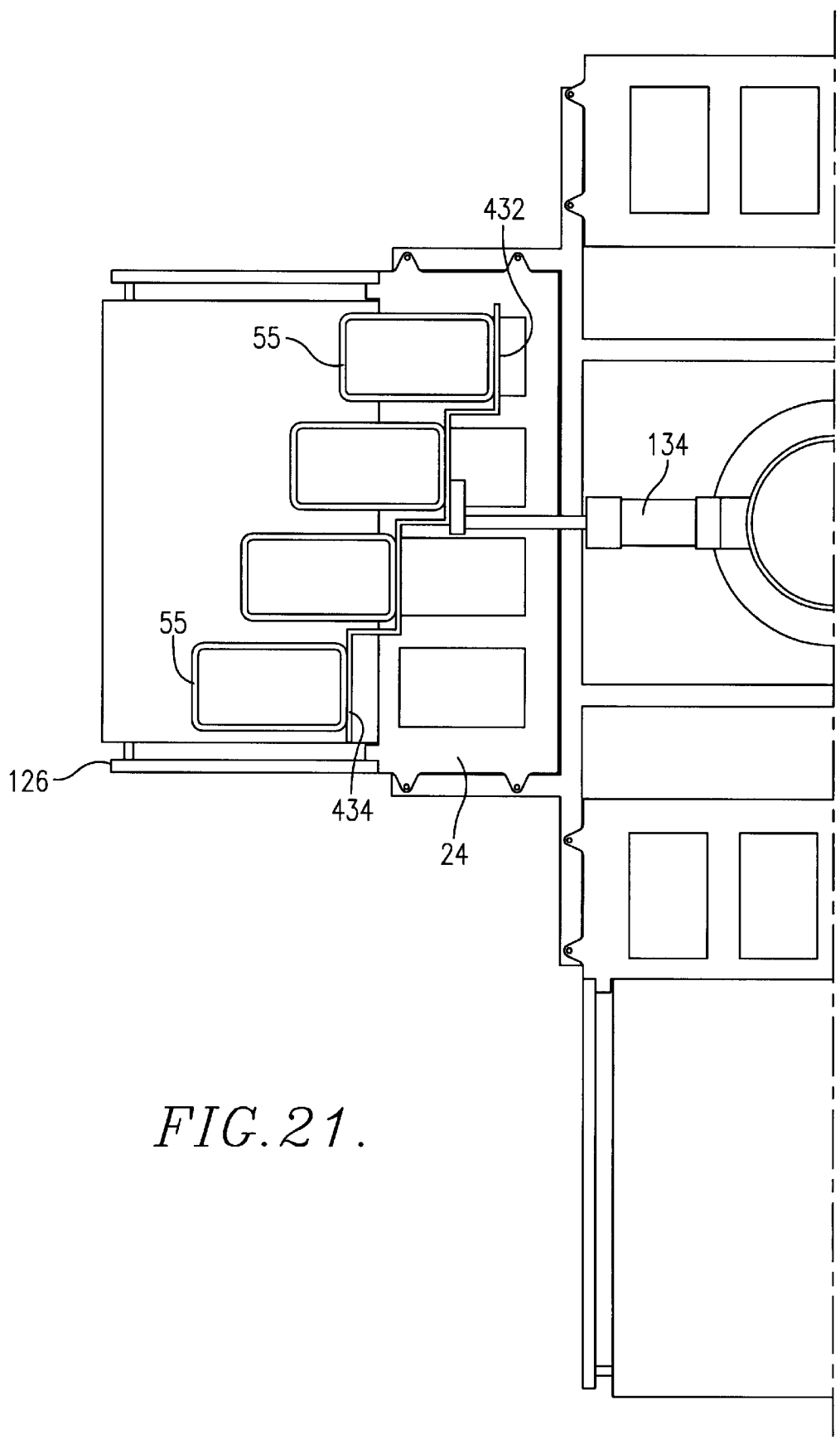
FIG. 21 is a top plan view of another embodiment of tray unloader.
Figure 22A:
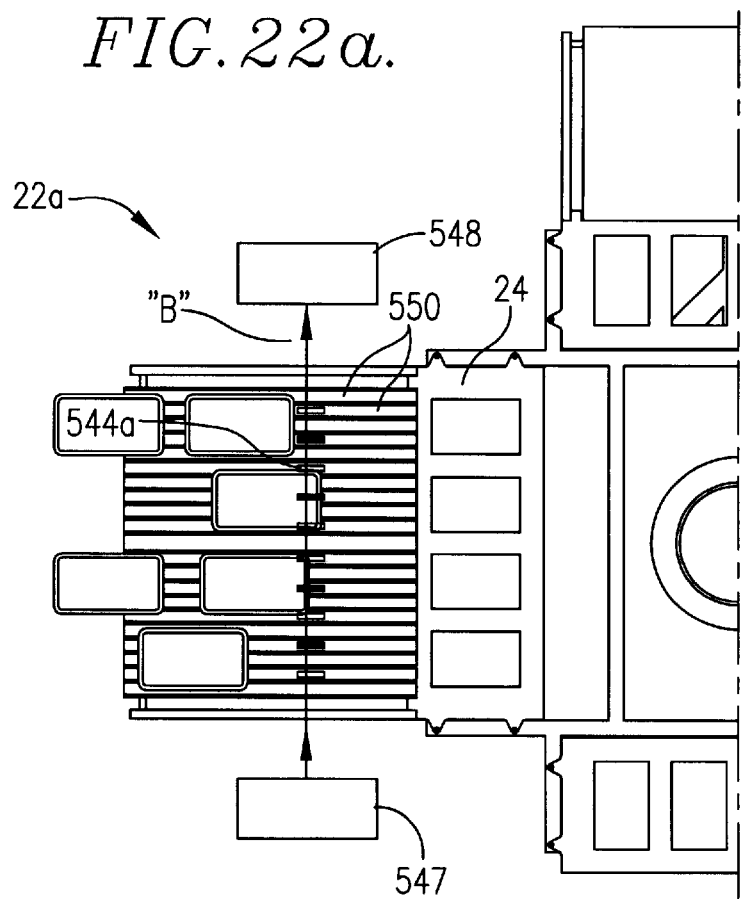
Figure 22B:
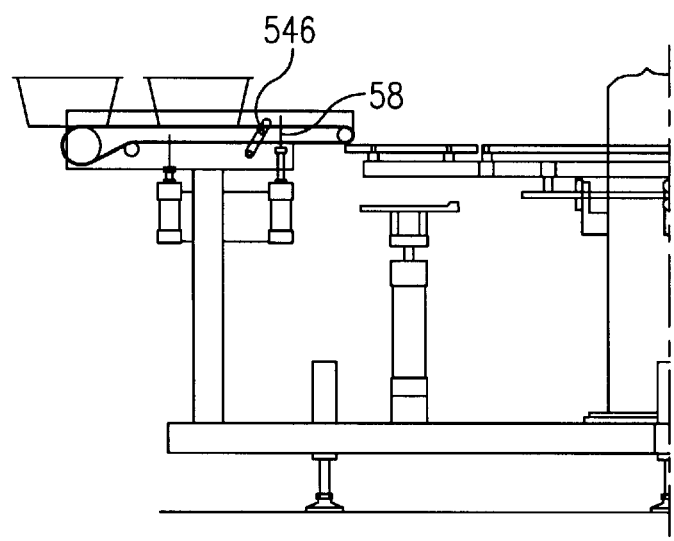
FIGS. 22b and 22d are side elevational views of the tray loader.
Figure 22C:
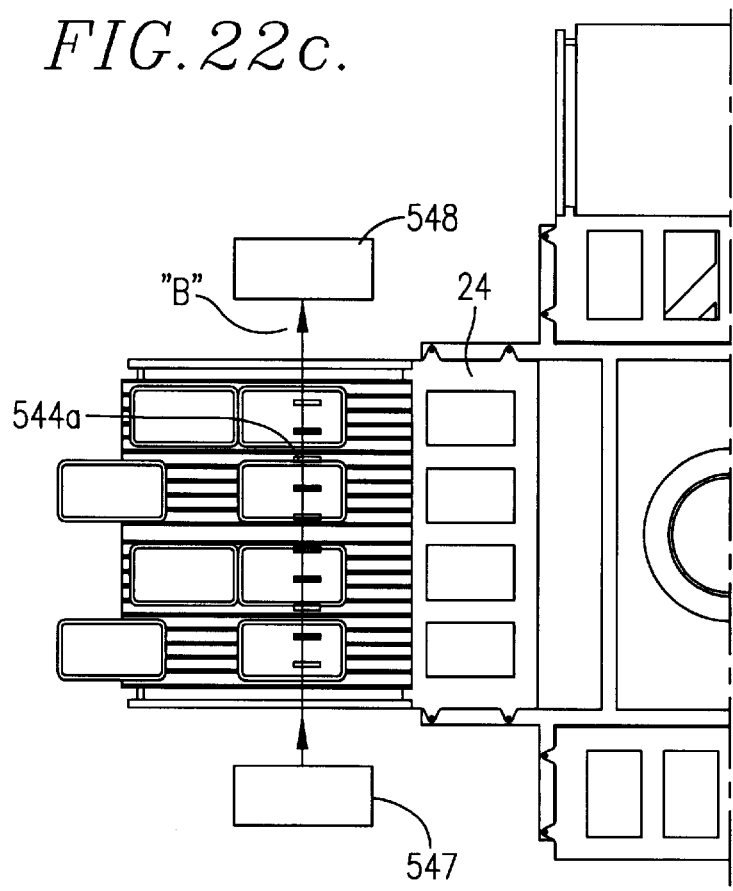
Figure 22D:
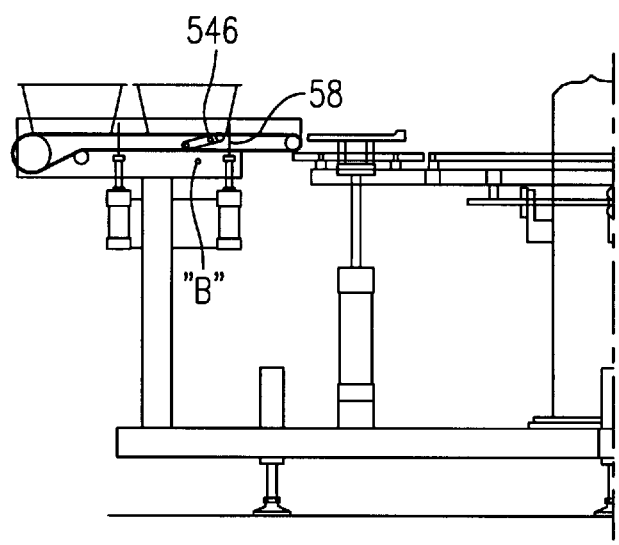

A stair-stepped tray unloading slider 432, shown in FIG. 21, includes a stair-stepped series of pushers 434. When the cylinder 134 reciprocates, each of the trays 55 are pushed a different distance onto the conveyor 126.

The trays 55 may then be off-loaded to a second conveyor (not shown) which advantageously may be a belt is conveyor operated at a higher speed than the conveyor 126. In this way, the initial offsetting provided by the slider 432 can be amplified sufficiently that each of the trays are offset at least one tray length from one another. Using an appropriate guide (not shown), the suitably offset trays may be easily guided into a single file line of trays.

A tray loader mechanism 542, shown in FIG. 22, includes a system to enable different sizes of trays to be accommodated by essentially the same packaging machine. While the platform 24 illustrated in FIG. 22 may accommodate four trays 55 at one time, it may be desirable to operate the machines with a different number of trays per platform. For example, with wider trays, it may be desirable to operated with three trays per platform.

The station 22a may advantageously be designed to operate only when all available platform 24 openings 26 are filled. This may be accomplished using a series of pivotal flags 544 and an infrared light detecting device 548. The flags 544 pivot about the pin 546 from the "up" position shown in FIG. 22a to the "down" position shown in FIG.

22c. A light beam "B" produced by an infrared light source 547 is blocked when any of the series of flags 544 are in the "up" position, the station 22a may be disabled.

Advantageously, a series of flags 544 are positioned across the width of the conveyor 50. Each flag 544 protrudes upwardly in the "up" position above the upper surface of the conveyor 50. The conveyor 50 may be formed of a plurality of thin belt strips 550 which are straddled by the flags 544, for example.

In this way, when a tray 55 passes over a flag 544, the flag 544 is pivoted to the down position. If the flags 544 are suitably spaced across the width of the conveyor, any possible tray width will be sensed. Thus, at one time, the machine can be run with four trays per platform and at other times, it may be run, for example, with three trays per platform. Because the flag system detects the absence of a full contingent of trays, and because unnecessary flags, such as the flags 544a in FIG. 22c, may be set in the "down" position, the machine quickly accommodates different tray sequences. Flags may be latched down using a suitable catch (not shown).

When the programmed tray sequence is present as sensed by a full contingent of "down" flags, the light beam "B" is detected by a suitable detector 548. The stop bar 58 may be lowered to allow tray loading. On the other hand, so long as even one flag 544 is "up," tray loading will be prevented. Since the lower ends of the pivoted flags are heavier than the upper ends, the flags 544 return to the "up" position after the trays move over the flags.

Figure 23:
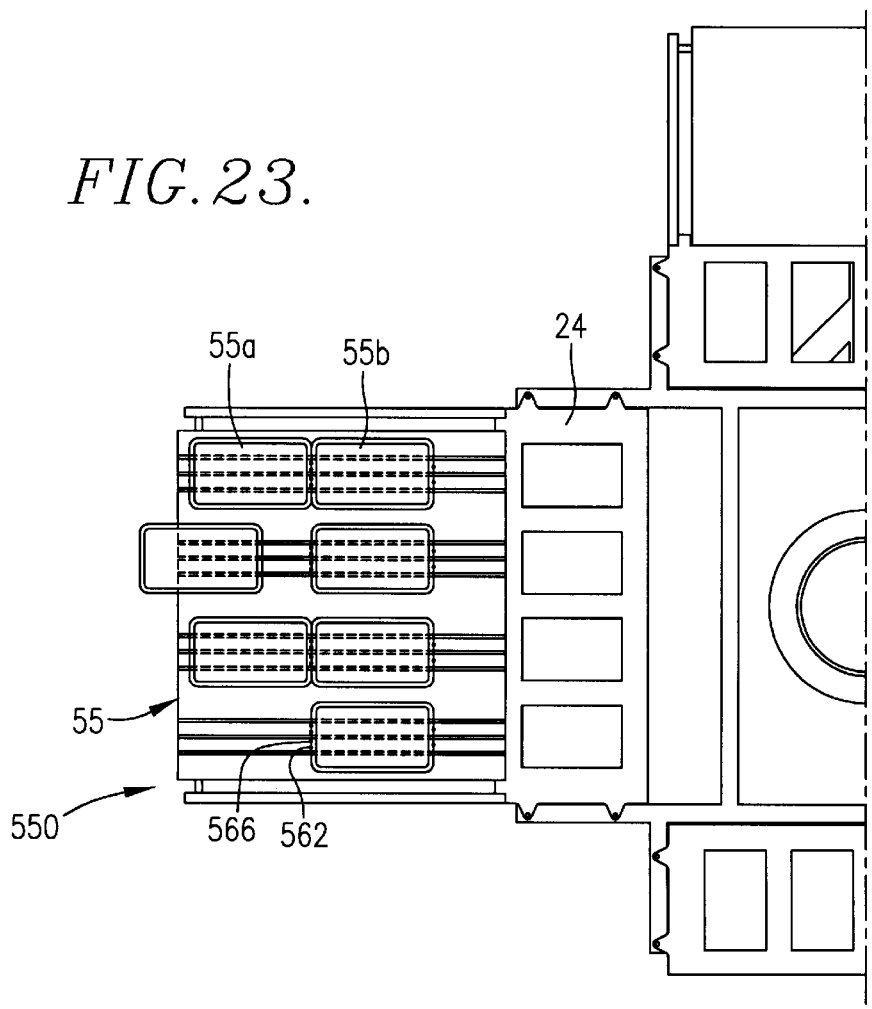
FIG. 23 is a top plan view of another tray loader with two trays overlapping.

A tray loader 550 which includes the capability to separate trays that have become inadvertently connected to one another is shown in FIGS. 23 through 26. As shown in FIG. 23, a pair of trays 55a and 55b may have their flanges overlapped so that the trays become stuck to one another and travel along the conveyor 50 together. This may be undesirable because when the trailing tray is stopped, the leading tray may not proceed onto the tray platform 24 at the desired time.

Figure 24:
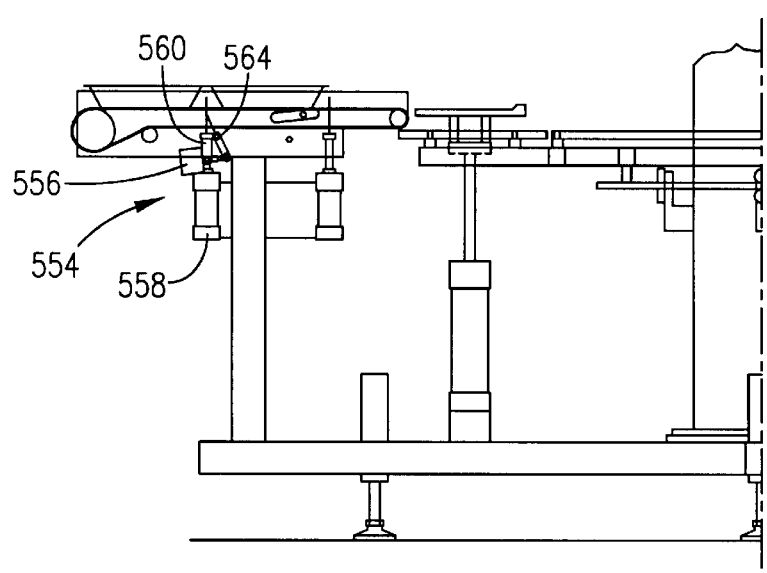
FIG. 24 is a side elevational view of the tray loader of FIG. 23.

As shown in FIG. 24, tray loader 550 includes a modified stop bar 554 powered by a pair of cylinders 556 and 558. The cylinder 558 connects to the element 560 to allow upward and downward reciprocation of its free end 562. Astride the element 560 is an element 564 having a free end 566. The element 564 connects to the cylinder 556 in such a fashion that it may pivot towards and away from the element 560 in the direction of movement of the conveyor 50. As shown in FIG. 23, a pair of elements 560 and 564 may be used with each tray, if desired.

Figure 25:
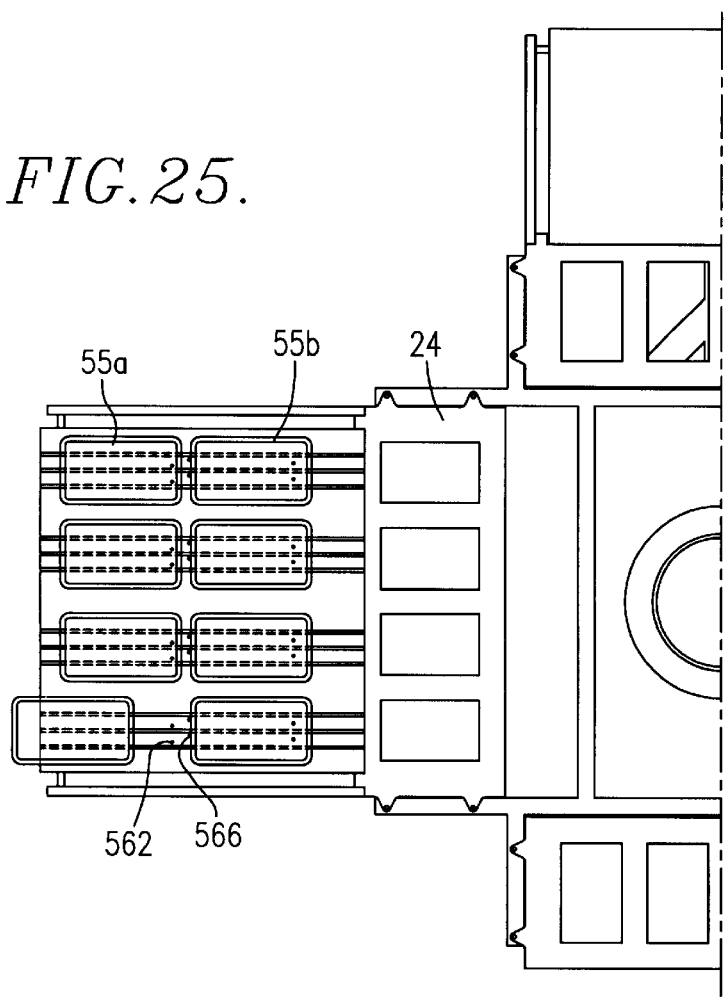
FIG. 25 is a top plan view of the tray loader of FIG. 23 after the overlapped trays have been separated.
Figure 26:
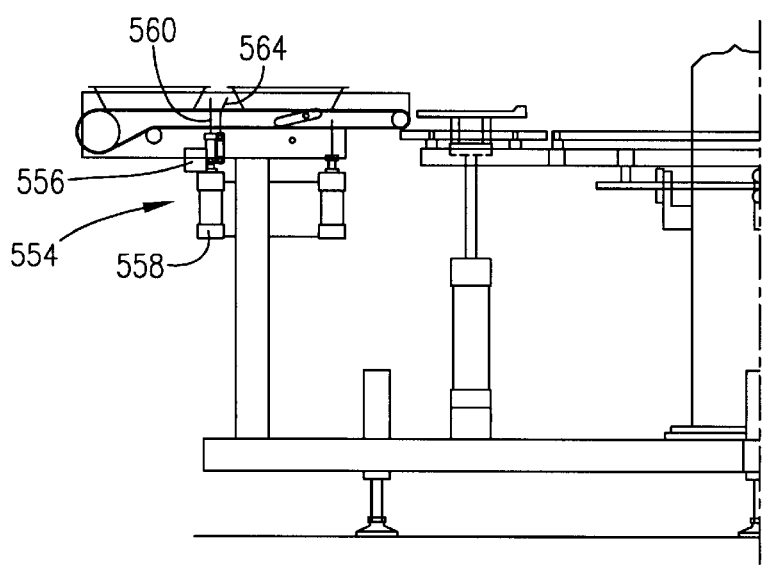
FIG. 26 is a side elevational view of the tray loader shown in FIG. 25.

Referring to FIGS. 25 and 26, the trays 55a and 55b may be separated from one another by operating the cylinder 556 to pull the element 564 in one direction causing pivoting movement of its free end 566 forwardly. As shown in FIG. 26, the element 564 may be angled to augment the forward movement provided to the lead tray 55b. If the separator mechanism is operating in every instance, any time trays which are overlapped exist, they will be automatically separated. Moreover, the acceleration provided to the lead tray helps it to stay in contact with the conveyor 50. After one cycle, the cylinder 556 may be operated to return the element 564 to the position shown in FIGS. 23 and 24.

Because of the heat generated by the severing assembly 288, possibly augmented by other operations inside the housing 49, such as the operation of the sealer 86, excessive heat build-up may occur inside the housing 49. Of course, it is necessary to operate the housing 49 in a closed condition to allow the desired gaseous atmosphere to be established inside the package 55. As a result, the heat generation during operations may be so substantial as to adversely affect the packaging operation. For example, where heat shrinkable films 92 are utilized, these films may be adversely affected and may begin shrinking during the manufacturing process. In addition, a variety of heat-related problems may arise, including adverse effects to the severing equipment.

Figure 27:
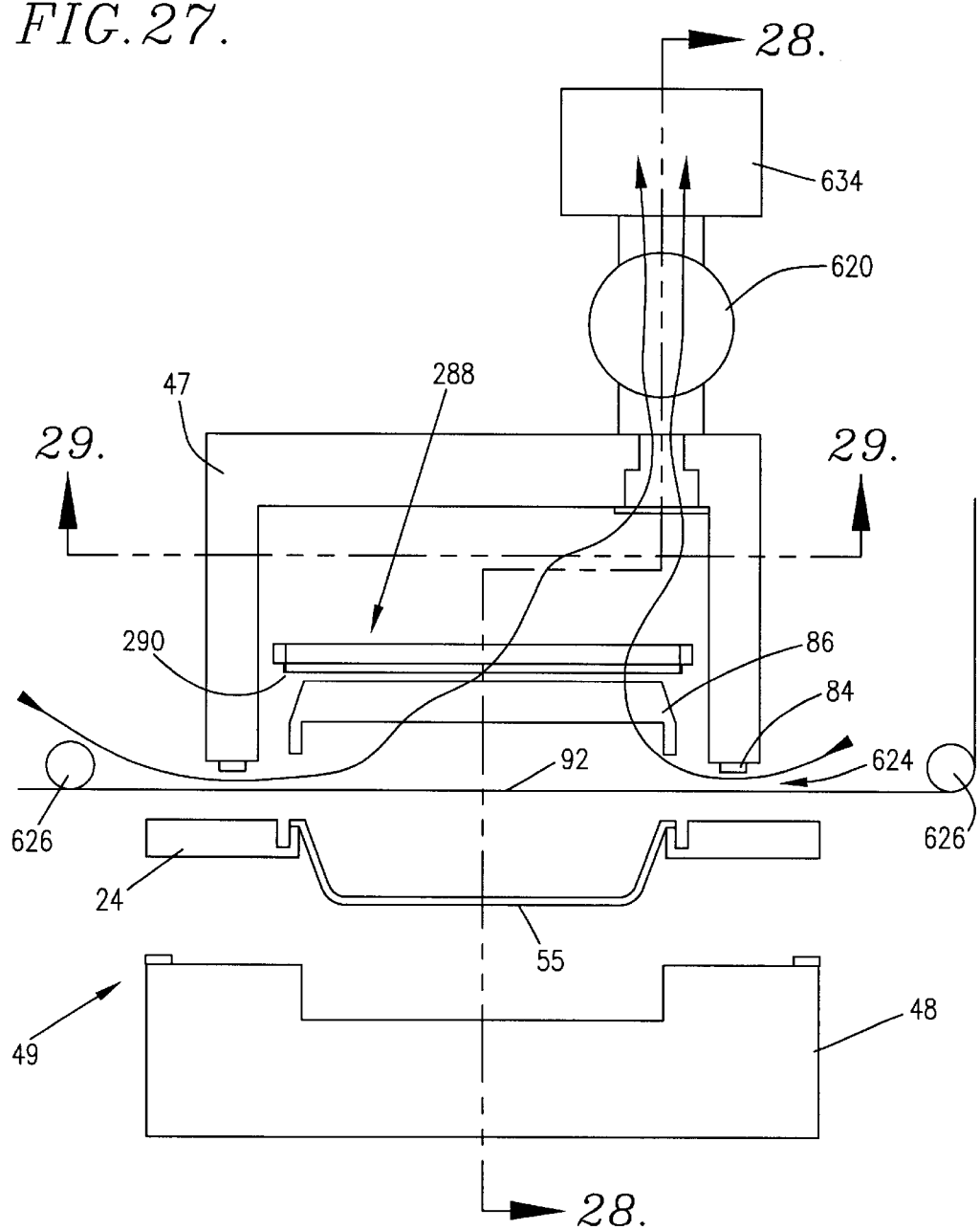
FIG. 27 is a cross-sectional view, corresponding to FIG. 15, but showing a different embodiment.

These problems may be alleviated by the structure shown in FIG. 27. When the apparatus is in an idle state, the upper housing portion 47 is spaced away from the lower housing portion 48. An opening 624 is created between the film 92 and the lower edge seal 84 of the upper housing portion 47. The opening 624 is the result of appropriate positioning of the rollers 626. The valve 620 may be automatically operated to allow gas flow from the opening 624 upwardly through the valve 620, as indicated by the arrows. This can be accomplished using commercially available programmable controllers, for example.

Figure 28:
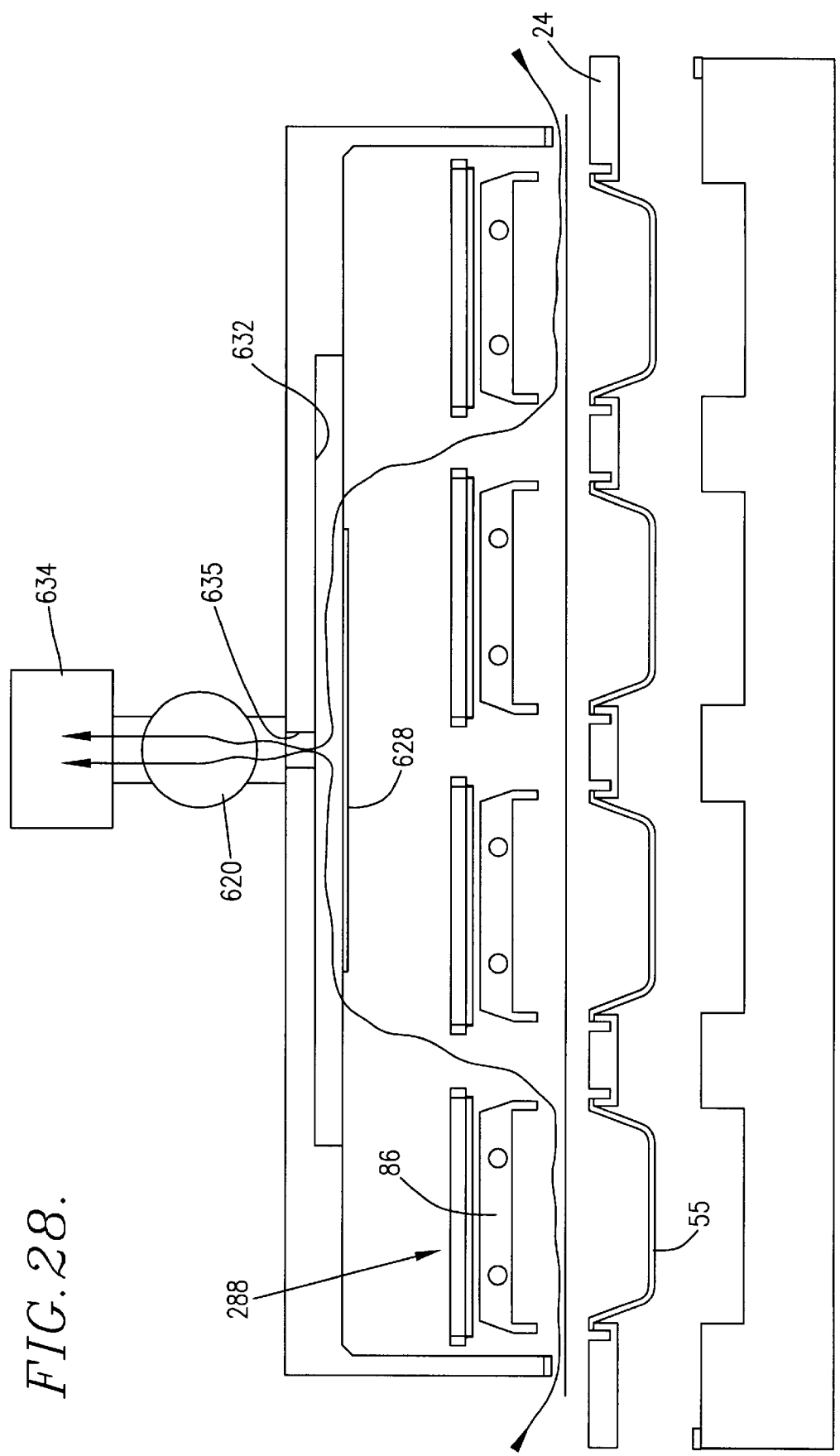
FIG. 28 is an enlarged cross-sectional view taken along the line 28—28 in FIG. 27.
Figure 29:
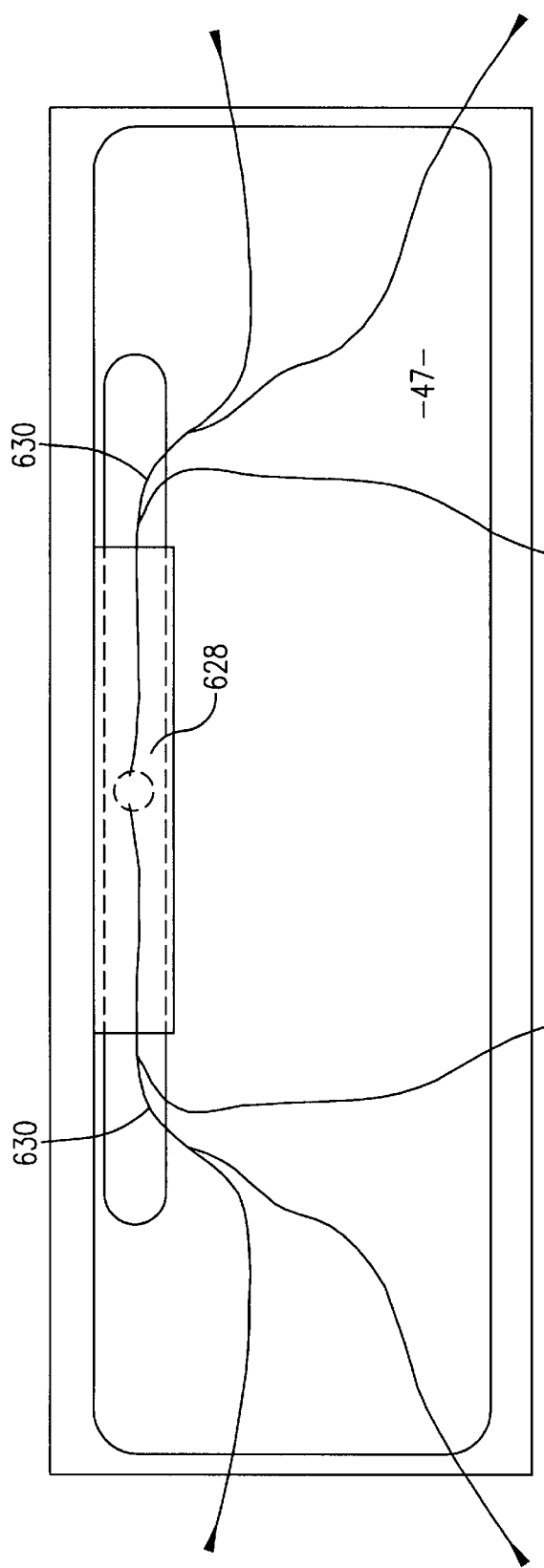
FIG. 29 is an enlarged cross-sectional view taken generally along the line 29—29 in FIG. 27.

In this way, the high temperature gas inside the chamber 49 may be exhausted and may be replaced with a lower temperature atmosphere. The air flow moves across the severing assembly 288 and the blade 290, as shown in FIG. 28.

When the next packaging operation is ready to be initiated, the valve 620 may be automatically closed. The lower housing portion 48 is then reciprocated upwardly, lifting the platform 24 and sealing the film 92 between the seal 84 and the platform 24. The upper housing portion 47 may be stationary during this operation or, if desired, it can be moved toward the lower housing portion 48. When the upper housing portion 47 is stationary, the film 92 is deflected upwardly to meet the seal 84. At the conclusion of sealing and severing operations, the portion 48 may be reciprocated away from the upper housing portion 47, allowing the film 92 to snap back to its undeflected position.

In order to distribute the cooling air flow uniformly through the apparatus, a baffle 628 may be used to create multiple air flow paths 630 to the valve 620. The valve 620 may also be connected to a suction source, such as a vacuum pump 634. Air drawn underneath the upper housing portion 47 is distributed upwardly through the upper housing portion 47, entering the slot 632 at two points because of the effect of the baffle 628. The air passes through the slot 632 and housing aperture 635 to the valve 620.

The severing assembly 288 and blade 290 are also advantageously mounted for reciprocation so that in their idle state they are spaced away from the hot sealer 86. As shown, the assembly 288 and blade 290 in their idle state are spaced above the idled sealer 86. This helps prevent overheating of the severing assembly 288 and blade 290 by the sealer 86 and also effects cooling of that assembly during the idle state due to the upward air flow through the housing portion 47.

While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A packaging method using a plastic film cutting tool, said tool including a closed cutting blade for cutting a web of plastic film, said cutting blade being supported on a blade support for movement towards and away from said film and said blade support being insulated from said cutting blade, said method comprising the steps of:

a. heating a portion of said blade to a temperature between about 600° F. to 900° F.;

b. causing the temperature of said cutting blade to exceed the temperature of said support;

c. allowing said blade to heat expand relative to said blade support;

d. bringing said film and said heated portion of said cutting blade into close proximity;

e. non-linearly severing said film by heating the film adjacent said cutting blade;

f. causing said severed film to shrink away from said cutting blade; and g. cutting a closed shape out of said web of plastic film with said cutting blade.

2. The method of claim 1, further including the step of transferring heat to said blade at a location proximate to the location where said blade contacts said film.

3. The method of claim 1, wherein said cutting tool is quickly retracted from said film after cutting.

4. The method of claim 1, including the step of maintaining the temperature continuously above 600° F.

5. The method of claim 1, including the step of holding said film at two closely spaced locations during cutting.

6. The method of claim 1, including the step of tensioning said film prior to cutting.

7. The method of claim 1, including the step of cutting a shape from said web of plastic film.

8. The method of claim 1, including the step of contacting said film with said heated portion of the blade.

9. A packaging machine including an apparatus for cutting a film portion from a plastic film web, said apparatus comprising:

a blade arranged in a substantially closed geometrical shape;

a heating element for heating said blade;

a mechanism for moving said blade towards and away from the web to be cut; and a blade mounting device connecting said mechanism to said blade, said device adapted to permit heat expansion of said blade relative to said mechanism.

10. The machine of claim 9, wherein said device includes insulation to decrease the heat transfer from said blade to the rest of the machine.

11. The machine of claim 9, wherein said device is resiliently connected to said mechanism.

12. The machine of claim 9, wherein said blade is connected to said mechanism at a series of spaced locations.

13. The machine of claim 12, wherein said blade is connected to said mechanism so as to prevent expansion of said blade relative to said device at at least one of said locations.

14. The machine of claim 12, wherein said blade is connected to said mechanism so as to provide at least one degree of freedom for expansion at a plurality of said locations.

15. The machine of claim 14, wherein said blade is connected to said mechanism so as to prevent expansion of said blade relative to said device at at least one of said locations, and said blade is mounted for unrestrained expansion of said blade at a plurality of said locations.

16. A packaging method using a plastic film cutting tool having a cutting blade supported on a blade support assembly, said blade arranged to cut a shape from a web of plastic film, said method comprising the steps of:

heating a portion of said blade to temperatures sufficient to vaporize the film around the shape to be severed from the web;

bringing the film and said cutting blade into close proximity above the shape to be severed from the web;

allowing said heated portion of said blade to heat expand relative to said blade support assembly;

supporting said heated portion with said blade support assembly at at least two locations;

fixing said heated portion of said blade to said support assembly to prevent relative heat expansion at one location where said heated portion is supported by said blade support assembly; and allowing said heated portion to heat expand relative to said blade support assembly at another location where said heated portion is supported by said blade support assembly.

17. The method of claim 16, said heated portion having at least four sides, said method further including the step of allowing said heated portion of said blade to move relative to the support assembly with one degree of freedom on one side where said heated portion connects to said support assembly and allowing said heated portion of said blade to move relative to the support assembly with more than one degree of freedom at the other sides wherein said heated portion connects the said support assembly.

\* \* \* \* \*